(12) United States Patent
Machida et al.

(10) Patent No.: US 12,515,306 B2
(45) Date of Patent: Jan. 6, 2026

(54) RECIPROCATING TOOL

(71) Applicant: MAKITA CORPORATION, Anjo (JP)

(72) Inventors: Yoshitaka Machida, Anjo (JP); Yusuke Takano, Anjo (JP); Takumi Sugisaka, Anjo (JP); Mizuki Yamamoto, Anjo (JP); Makoto Chikaraishi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/380,398

(22) Filed: Oct. 16, 2023

(65) Prior Publication Data

US 2024/0149422 A1  May 9, 2024

(30) Foreign Application Priority Data

Nov. 4, 2022  (JP) .................................. 2022-177511
Jun. 27, 2023  (JP) .................................. 2023-104869
Jun. 27, 2023  (JP) .................................. 2023-104870

(51) Int. Cl.
  *B25D 17/04*  (2006.01)
  *B25D 16/00*  (2006.01)

(52) U.S. Cl.
  CPC .......... *B25D 17/043* (2013.01); *B25D 16/006* (2013.01); *B25D 2250/095* (2013.01)

(58) Field of Classification Search
  CPC ............ B25D 17/043; B25D 2250/095; B25D 16/006
  See application file for complete search history.

(56) References Cited

U.S. PATENT DOCUMENTS 6,127,751 A  10/2000 Kristen et al.
6,851,898 B2  2/2005 Ege et al.
(Continued)

FOREIGN PATENT DOCUMENTS

JP  2006-334725 A  12/2006
JP  2013-013951 A  1/2013
(Continued)

OTHER PUBLICATIONS

U.S. Appl. No. 18/380,412, filed Oct. 16, 2023 in the name of Yoshitaka Machida et al.
(Continued)

*Primary Examiner* — Thomas M Wittenschlaeger
(74) *Attorney, Agent, or Firm* — Oliff PLC

(57) ABSTRACT

A reciprocating tool includes a body housing, a handle member and an elastic member. A first one of the body housing and the handle member includes a first coupling part, while a second one includes a second coupling part. The first coupling part includes an internal space, and an opening that communicates with the internal space and an outside space of the first coupling part. At least a portion of the second coupling part protrudes into the internal space through the opening and is movable relative to the first coupling part in the front-rear direction within the opening. The elastic member is disposed in the internal space and is configured to bias the first coupling part and the second coupling part such that the body housing and the handle member are biased away from each other in the front-rear direction.

15 Claims, 13 Drawing Sheets

(56) References Cited

U.S. PATENT DOCUMENTS

| | | |
|---|---|---|
| 7,308,950 B2 | 12/2007 | Faatz et al. |
| 7,588,097 B2 | 9/2009 | Kamegai et al. |
| 7,705,497 B2 | 4/2010 | Arich et al. |
| 9,156,152 B2 | 10/2015 | Machida |
| 9,321,163 B2 | 4/2016 | Onoda et al. |
| 2003/0132016 A1* | 7/2003 | Meixner .............. B25D 17/043 173/162.2 |
| 2006/0272836 A1 | 12/2006 | Hirayama et al. |
| 2008/0210447 A1* | 9/2008 | Robieu ................... B25F 5/006 173/29 |
| 2013/0000937 A1 | 1/2013 | Onoda et al. |
| 2018/0345469 A1* | 12/2018 | Tanabe ................. B25D 17/043 |
| 2019/0314971 A1* | 10/2019 | Yoshikane ........... B25D 11/125 |
| 2020/0078919 A1 | 3/2020 | Machida et al. |
| 2022/0258320 A1 | 8/2022 | Machida et al. |
| 2022/0388106 A1 | 12/2022 | Yoshikane et al. |
| 2023/0415323 A1 | 12/2023 | Ichikawa et al. |

FOREIGN PATENT DOCUMENTS

| | | |
|---|---|---|
| JP | 2019-181605 A | 10/2019 |
| JP | 2020-040161 A | 3/2020 |
| JP | 2022-185909 A | 12/2022 |

OTHER PUBLICATIONS

U.S. Appl. No. 18/380,429, filed Oct. 16, 2023 in the name of Yoshitaka Machida et al.

Nov. 27, 2024 Non-Final Rejection received in U.S. Appl. No. 18/380,429.

* cited by examiner

RECIPROCATING TOOL

CROSS-REFERENCE TO RELATED APPLICATION

The present application claims priority to Japanese patent applications No. 2022-177511 filed on Nov. 4, 2022, No. 2023-104869 filed on Jun. 27, 2023 and No. 2023-104870 filed on Jun. 27, 2023. The contents of the foregoing applications are hereby incorporated by reference in their entirety.

TECHNICAL FIELD

The present disclosure relates to a reciprocating tool that is configured to linearly reciprocate a tool accessory.

BACKGROUND

A reciprocating tool is configured to linearly reciprocate a tool accessory along a driving axis. When the tool accessory is driven, relatively large vibration is caused in an extension direction of the driving axis (a front-rear direction). Thus, some known reciprocating tools include a vibration-isolating handle structure for reducing vibration to be transmitted to a grip part. For example, Japanese laid-open patent publication No. 2020-040161 discloses a rotary hammer (hammer drill) in which an upper end portion of a handle and a rear end portion of a body housing are coupled to each other such that the handle and the body housing are relatively movable in a front-rear direction. Further, an elastic member is interposed between the upper end portion of the handle and the rear end portion of the main hosing, so that the elastic member biases the upper end portion of the handle and the rear end portion of the body housing away from each other.

SUMMARY

In the above-described rotary hammer, a coupling structure between the handle and the body housing (e.g., an elongate hole of the handle and a protrusion of the body housing inserted into the elongate hole) and the elastic member (e.g., a compression coil spring) are aligned (arranged side by side) in the front-rear direction. Such a configuration requires a relatively large area in the front-rear direction. Further, if the handle and the body housing are designed to be relatively movable by a larger amount (longer distance), the length of the rotary hammer in the front-rear direction will increase.

Accordingly, it is a non-limiting object of the present disclosure to provide improvement in a vibration-isolating handle structure of a reciprocating tool.

One non-limiting embodiment according to the present disclosure herein provides a reciprocating tool that includes a motor, a reciprocating mechanism, a body housing, a handle member, and an elastic member. The reciprocating mechanism is operably coupled to the motor and is configured to linearly reciprocate a tool accessory along a driving axis. The driving axis defines a front-rear direction of the reciprocating tool. The body housing houses the motor and the reciprocating mechanism. The handle member includes a grip part. The grip part is located rearward of the body housing and extends in an up-down direction that intersects the driving axis.

A first one of the body housing and the handle member includes a first coupling part. A second one of the body housing and the handle member includes a second coupling part. The body housing and the handle member are coupled via the first coupling part and the second coupling part to be movable relative to each other in the front-rear direction. The phrase "the body housing and the handle member are movable relative to each other in the front-rear direction" herein not only covers a case in which the body housing and the handle member are movable relative to each other strictly only in the front-rear direction, but also a case in which the body housing and the handle member are at least partially movable relative to each other and the relative movement has at least a component in the front-rear direction. The first coupling part has an internal space and an opening. The opening of the first coupling part communicates with the internal space and an outside space of the first coupling part. At least a portion of the second coupling part protrudes into the internal space through the opening of the first coupling part. Further, the portion of the second coupling part is movable relative to the first coupling part in the front-rear direction within the opening. The elastic member is disposed in the internal space of the first coupling part. The elastic member is configured to bias the first coupling part and the second coupling part such that the body housing and the handle member are biased away from each other in the front-rear direction.

According to this embodiment, the elastic member biases the body housing and the handle member away from each other in the front-rear direction via the first coupling part and the second coupling part, so that dominant vibration in the front-rear direction that is caused in response to reciprocating driving of the tool accessory can be effectively absorbed. The body housing and the handle member are coupled via the first coupling part and the second coupling part that protrudes into the internal space through the opening of the first coupling part, to be movable relative to each other in the front-rear direction, and the elastic member is disposed in the internal space of the first coupling part. Thus, the first coupling part has a function of housing the elastic member, in addition to a function of coupling the body housing and the handle member in cooperation with the second coupling part. Therefore, the elastic member as well as the coupling structure between the handle member and the body housing can be accommodated in a region that is smaller in the front-rear direction than that required for the above-described known structure, and thus the reciprocating tool can be made smaller in the front-rear direction. Alternatively or in addition, the handle member and the body housing can be designed to be relatively movable by a larger amount (longer distance) than the known structure, without enlarging the reciprocating tool in the front-rear direction.

DETAILED DESCRIPTION OF THE EMBODIMENTS

Figure 1:
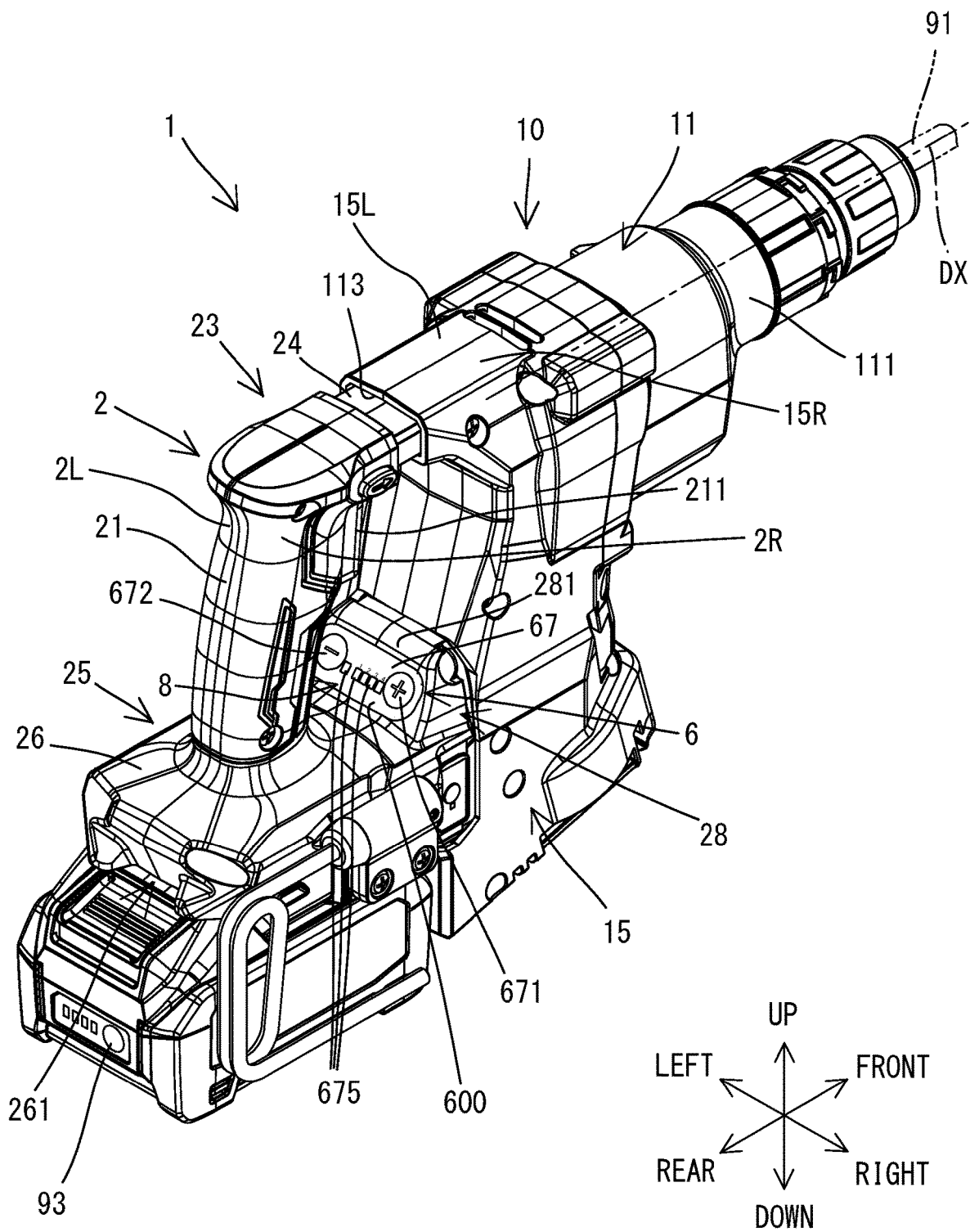
FIG. 1 is a perspective view of a rotary hammer.

In one non-limiting embodiment according to the present disclosure, the handle member may include the first coupling part. The body housing may include the second coupling part that is configured as a protrusion. According to this embodiment, the body housing that houses the motor and the reciprocating mechanism includes the second coupling part, which is a protrusion, while the handle member includes the first coupling part that has the internal space and the opening. Therefore, an assembler (a person who assembles the reciprocating tool) can easily position the opening of the first coupling part of the handle member relative to the second coupling part (the protrusion) of the body housing and then insert the second coupling part (the protrusion) into the opening. Consequently, ease of assembling can be improved.

In addition or in the alternative to the preceding embodiments, a portion that extends frontward from an upper end portion of the grip part may include the first coupling part. In general, a known handle member includes a portion that extends frontward from the upper end portion of the grip part in order to couple the grip part to the body housing. Thus, according to this embodiment, the portion that is originally or inherently included in the handle member can be utilized to provide the first coupling part, so that the handle member will not be complicated and/or enlarged.

In addition or in the alternative to the preceding embodiments, a direction that is orthogonal to the front-rear direction and the up-down direction may define a left-right direction of the reciprocating tool. At least a portion of the handle member may be formed by two handle halves that are coupled to each other in the left-right direction. The internal space of the first coupling part of the handle member may be defined by the two handle halves. According to this embodiment, the first coupling part having the internal space can be easily formed.

In addition or in the alternative to the preceding embodiments, at least a portion of the body housing may be formed by two housing halves that are coupled to each other in the left-right direction. A first one of the two housing halves may include the second coupling part. The second coupling part may be coupled to a second one of the two housing halves. According to this embodiment, a portion of a structure for coupling the two housing halves of the body housing can be utilized as the second coupling part, so that the structure of the body housing can be simplified.

In addition or in the alternative to the preceding embodiments, the elastic member may be directly in contact with a rear end of the second coupling part of the body housing in the front-rear direction. In other words, the second coupling part of the body housing may be configured as a spring receiver that receives a front end of the elastic member. According to this embodiment, the body housing does not need to include an additional spring receiver, so that the structure of the body housing can be simplified.

In addition or in the alternative to the preceding embodiments, a front end of the second coupling part of the body housing may be configured to define an initial position of the handle member relative to the body housing by abutting a portion of the first coupling part. Thus, the rear end and the front end of the second coupling part may be configured as a spring receiver and a positioning part for the initial position of the handle member, respectively. According to this embodiment, the body housing does not need to include an additional positioning part, so that the structure of the body housing can be simplified.

In addition or in the alternative to the preceding embodiments, a rear end portion of the body housing may have a rear end opening that opens rearward. The rear end opening may communicate with an internal space of the body housing and an outside space of the body housing. The first coupling part may extend into the body housing through the rear end opening. A rear end of the opening of the first coupling part may be located frontward of the rear end opening of the body housing. According to this embodiment, the opening of the first coupling part is within the body housing, so that a possibility can be reduced that dust enters the internal space through the opening of the first coupling part to cause a defective operation or malfunction of the elastic member.

In addition or in the alternative to the preceding embodiments, the body housing may include a third coupling part. The handle member may include a fourth coupling part. The body housing and an upper end portion of the handle member may be coupled via the first coupling part and the second coupling part to be movable relative to each other in the front-rear direction. The body housing and a lower end portion of the handle member may be coupled via the third coupling part and the fourth coupling part to be movable relative to each other around a pivot axis that extends in a left-right direction that is orthogonal to the front-rear direction and the up-down direction. According to this embodiment, the handle member can pivot relative to the body housing, corresponding to the vibration in the front-rear direction and the vibration in the up-down direction that is caused in the body housing, and at the same time, the elastic member can absorb the largest vibration in the front-rear direction caused in response to the reciprocating driving of the tool accessory.

In addition or in the alternative to the preceding embodiments, the first coupling part may be disposed such that a straight line that is orthogonal to the pivot axis and extends in the up-down direction intersects the first coupling part. In other words, the first coupling part may be disposed directly above the pivot axis. According to this embodiment, a direction in which the elastic member exerts a biasing force substantially coincides with an extension direction of a tangent line of a circle around the pivot axis having a radius defined by a line segment between the pivot axis and a portion of the first coupling part directly above the pivot axis. Thus, the elastic member is not subjected to undesirable stress, and thus the lifetime of the elastic member can be extended.

A rotary hammer (hammer drill) 1 according to a representative, non-limiting embodiment of the present disclosure is now described with reference to the drawings. The rotary hammer 1 is a power tool that is configured to perform a hammer action. In the hammer action, a tool accessory 91 that is removably held by the rotary hammer 1 is hammered (stricken), and thereby the tool accessory 91 is linearly reciprocated along a driving axis DX. The rotary hammer 1 is an example of a power tool having a hammer (striking) mechanism and is also an example of a reciprocating tool. The rotary hammer 1 may perform a rotary action and the hammer action at the same time, or perform the rotary action in the alternative to the hammer action. In the rotary action, the tool accessory 91 is rotationally driven around the driving axis DX.

Figure 2:
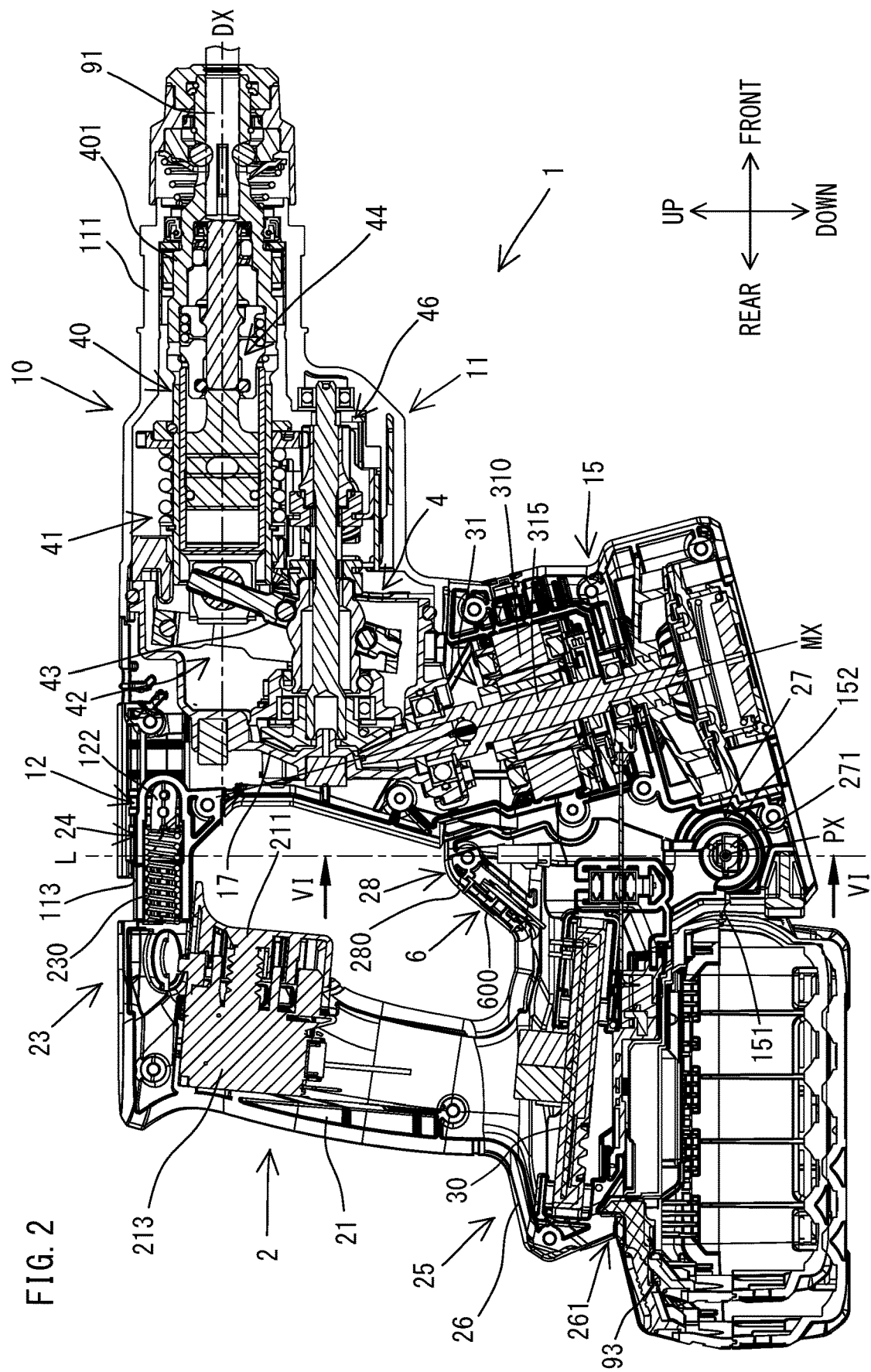
FIG. 2 is a sectional view of the rotary hammer.

First, the general structure of the rotary hammer 1 is described. As shown in FIGS. 1 and 2, an outline of the rotary hammer 1 is defined by a body housing 10 and a handle member 2 that is coupled to the body housing 10.

The body housing 10 is a hollow body that is also referred to as a tool body or an outer shell. The body housing 10 of this embodiment includes a first housing part 11 and a second housing part 15.

As shown in FIG. 2, the first housing part 11 mainly houses a spindle 40, which is a member for holding a tool accessory (i.e., a tool accessory holding member), and a driving mechanism 4 for driving the tool accessory 91. The spindle 40 is an elongate tubular member. One end portion of the spindle 40 in its longitudinal direction is structured as a tool holder 401 that is configured to removably hold the tool accessory 91. A longitudinal axis of the tool holder 401 (the spindle 40) defines the driving axis DX of the tool accessory 91.

The first housing part 11 extends along the driving axis DX. One end portion of the first housing part 11 in an extension direction of the driving axis DX has a hollow cylindrical shape, and the tool holder 401 is housed in this end portion, which is also referred to as a barrel part 111. The remaining portion of the first housing part 11 has a tubular shape that has a larger diameter than the barrel part 111.

The second housing part 15 mainly houses a motor 31. The second housing part 15 is coupled to one end portion of the first housing part 11 that is opposite to the barrel part 111 in the extension direction of the driving axis DX, and extends in a direction that intersects (more specifically, substantially orthogonal to) the driving axis DX. With such a configuration, the body housing 10 including the first housing part 11 and the second housing part 15 is formed in an L-shape as a whole.

The handle member 2 is a hollow member that has a U-shape as a whole. Opposite ends of the handle member 2 are coupled to the body housing 10 (the second housing part 15). The handle member 2 includes a grip part 21 that is configured to be gripped by a user. The grip part 21 extends in a direction that intersects (more specifically, substantially orthogonal to) the driving axis DX. The grip part 21 extends generally in parallel to an extension direction of the second housing part 15. The grip part 21 has a trigger 211 that is configured to be depressed by the user. The grip part 21 houses a main switch 213. When the trigger 211 is depressed and thus the main switch 213 is turned ON, driving of the motor 31 is started and the tool accessory 91 is driven by the driving mechanism 4.

The detailed structure of the rotary hammer 1 is now described. In the following description, for the sake of convenience, the extension direction of the driving axis DX is defined as a front-rear direction of the rotary hammer 1. In the front-rear direction, the side on which a distal end of the tool holder 401 is located (i.e., the side on which the tool accessory 91 is inserted into the tool holder 401) is defined as a front side of the rotary hammer 1, while the opposite side is defined as a rear side of the rotary hammer 1. A direction that is orthogonal to the driving axis DX and that substantially corresponds to an extension direction of the second housing part 15 (also an extension direction of the grip part 21) is defined as an up-down direction of the rotary hammer 1. In the up-down direction, the side on which the first housing part 11 is located is defined as an upper side of the rotary hammer 1, while the opposite side is defined as a lower side of the rotary hammer 1. A direction that is orthogonal to both of the front-rear direction and the up-down direction is defined as a left-right direction.

First, the detailed structure of the body housing 10 is described. As described above, the body housing 10 includes the first housing part 11 and the second housing part 15.

As shown in FIGS. 1 and 2, the first housing part 11 of the body housing 10 is a tubular member as a whole. An inner housing 17 is fitted into an opening 110 that is provided at a rear end of the first housing part 11 and thus closes the opening 110. A spindle 40 and the driving mechanism 4 are disposed in a space that is defined within the first housing part 11 and the inner housing 17.

The second housing part 15 of the body housing 10 is a hollow body that is coupled to the rear end portion of the first housing part 11 and extends in the up-down direction. An upper half of the second housing part 15 is coupled to the rear end portion of the first housing part 11, using screws. In this embodiment, the second housing part 15 is formed by coupling two (left and right) halves 15L and 15R, which are originally divided in the left-right direction, using screws. The inner housing 17 is within (covered by) the upper half of the second housing part 15. A lower half of the second housing part 15 houses the motor 31.

Figure 3:
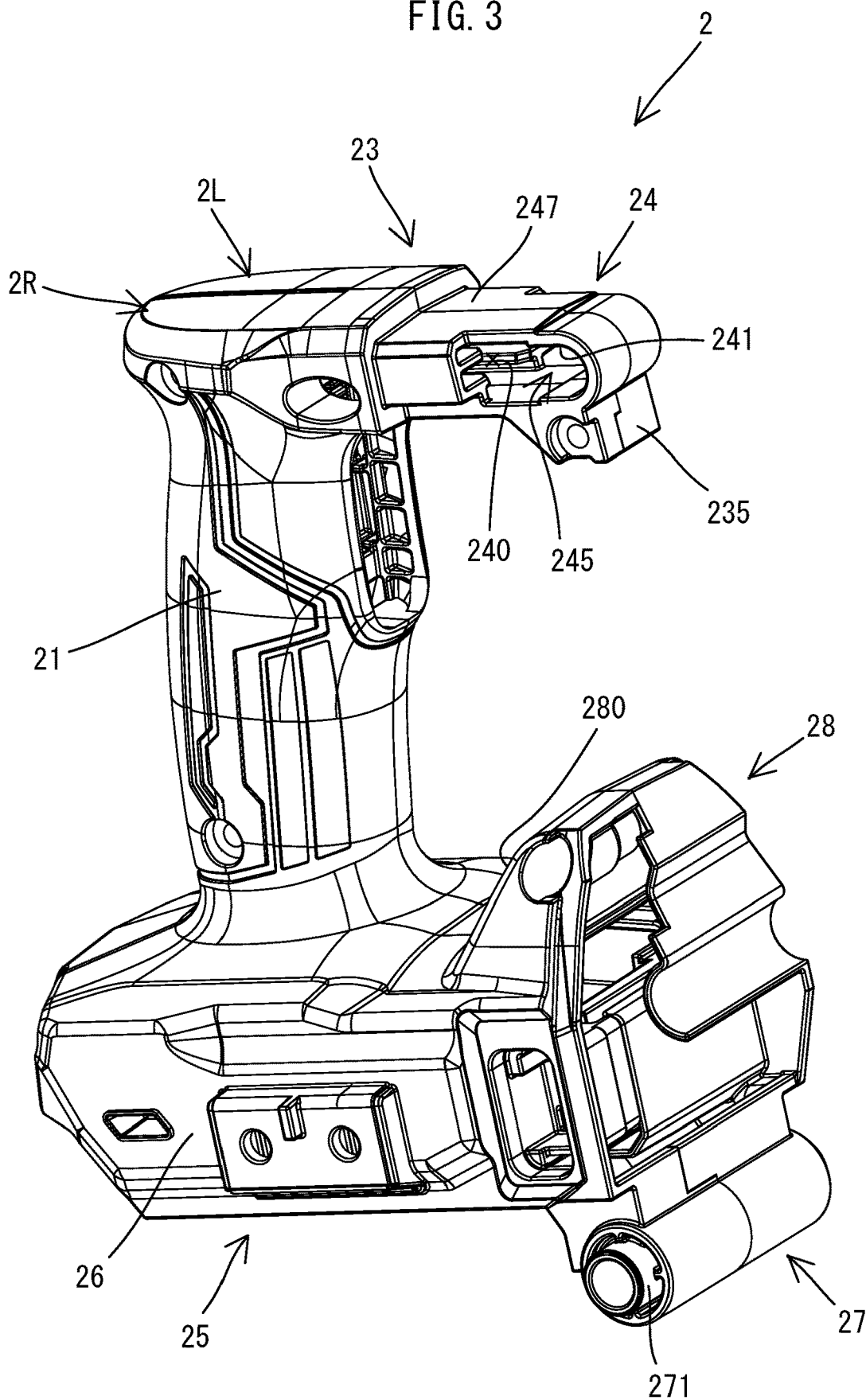
FIG. 3 is a perspective view of a handle member.
Figure 4:
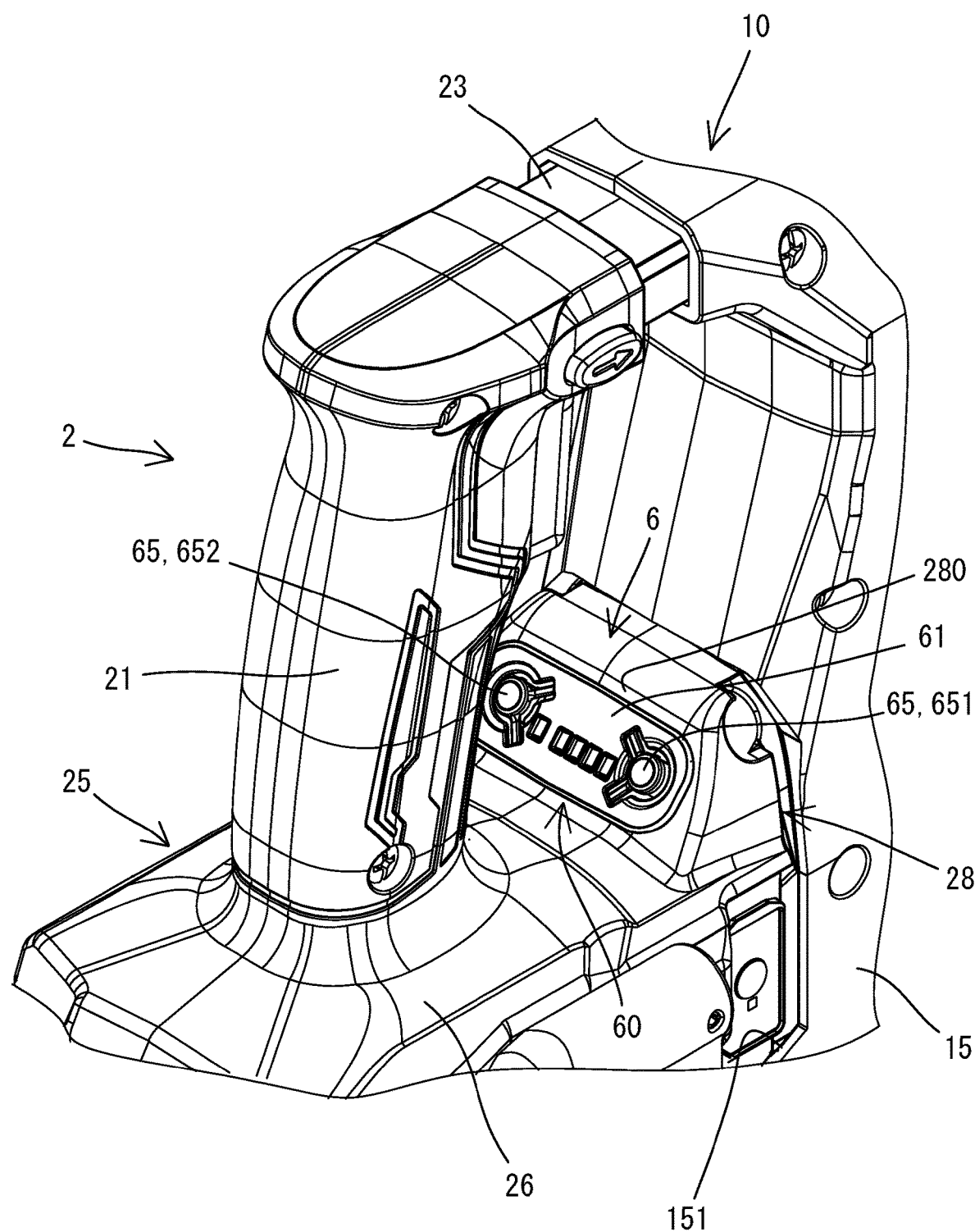
FIG. 4 is a partial, enlarged view of FIG. 1, wherein a flexible sheet of a manipulation part is not shown.
Figure 5:
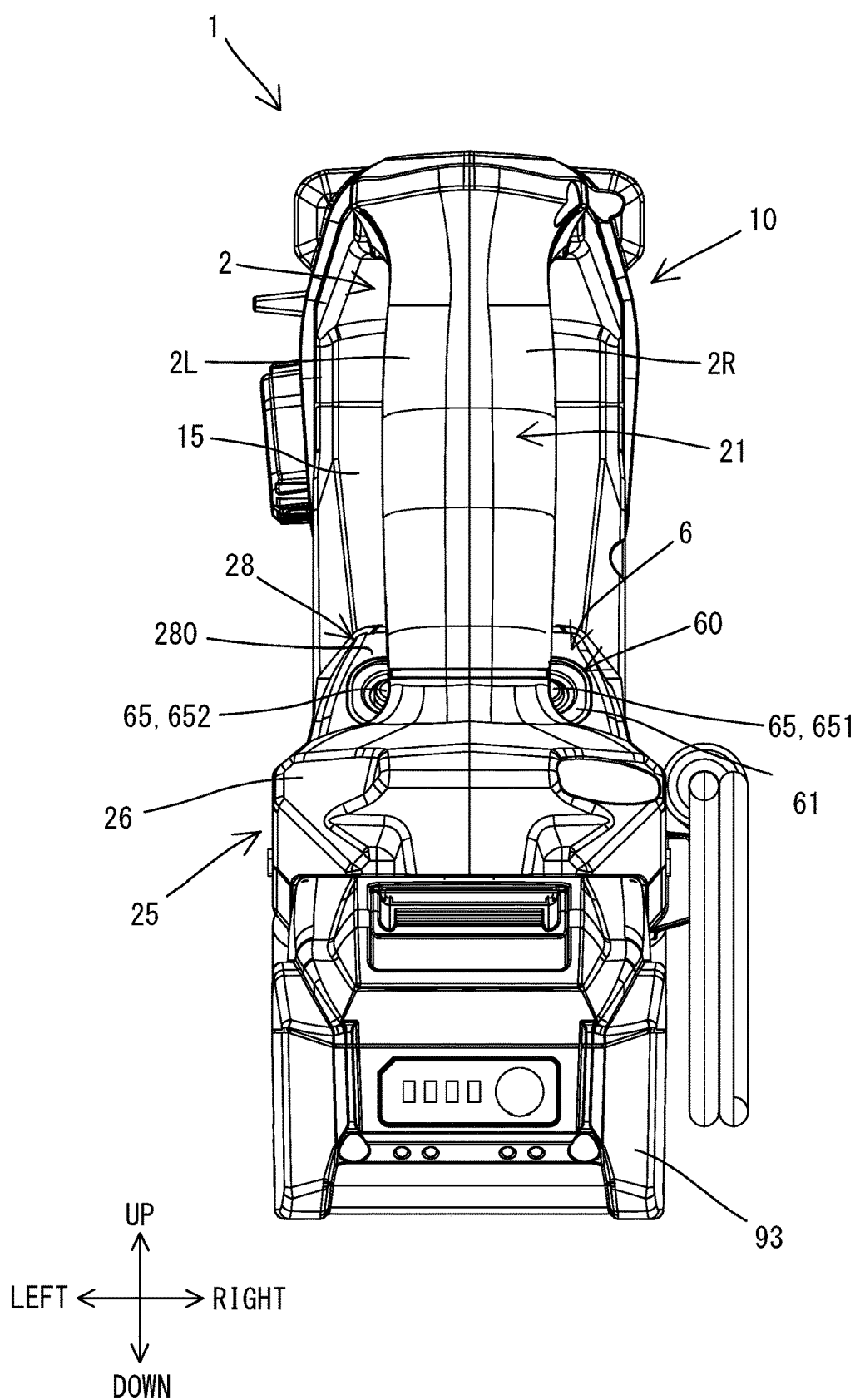
FIG. 5 is a rear view of the rotary hammer, wherein the flexible sheet of the manipulation part is not shown.

Next, the detailed structure of the handle member 2 is described. As shown in FIGS. 1 to 3, the handle member 2 includes the grip part 21, an upper extending part 23 that is coupled to an upper end of the grip part 21, and a lower extending part 25 that is coupled to a lower end of the grip part 21. The handle member 2 of this embodiment is formed by coupling two (left and right) halves 2L and 2R, which are originally divided in the left-right direction, using screws.

The grip part 21 is a tubular portion that is located rearward of the body housing 21 and extends in the up-down direction. The grip part 21 has a diameter that is suitable for gripping.

The upper extending part 23 extends frontward (toward the body housing 10) at the upper side of the grip part 21. A front end portion of the upper extending part 23 is elastically coupled to an upper rear end portion of the body housing 10 (the second housing part 15). An elastically coupling structure between the upper extending part 23 and the body housing 10 will be described in detail later.

The lower extending part 25 extends frontward at the lower side of the grip part 21. The lower extending part 25 includes a controller housing part 26, a pivotable coupling part 27, and a facing part 28.

The controller housing part 26 has a box-like shape. The controller housing part 26 is coupled to the lower end of the grip part 21. A portion of the controller housing part 26 protrudes frontward of the grip part 21. The controller housing part 26 defines a housing space for a controller 30 below the grip part 21.

A battery mount part 261 is provided in a lower end portion of the controller housing part 26 (below the controller 30). The battery mount part 261 is configured to removably hold a rechargeable battery (also referred to as a battery pack) 93. Although not shown and described in detail because it is a well-known structure, the battery mount part 261 includes a pair of rails that is physically engageable with a pair of grooves of the battery 93, and terminals that are electrically connectable with terminals of the battery 93. A lower end portion of the second housing part 15 is below the lower end of the controller housing part 26 in the up-down direction. When the battery 93 is mounted to the battery mount part 261, a front surface of the battery 93 faces a rear surface of the lower end portion of the second housing part 15.

In this embodiment, the battery mount part 261 is provided in the handle member 2, so that chattering that is caused when the battery 93 is mounted to the battery mount part 261 can be reduced, compared to a structure in which the battery mount part 261 is provided in the body housing 10. Further, when the battery 93 is mounted to the battery mount part 261, mass of the battery 93 is added to mass of the handle member 2, so that the vibration of the handle member 2 can be further reduced.

The pivotable coupling part 27 extends obliquely downward from a front end portion of the controller housing part 26. The pivotable coupling part 27 is coupled to the body housing to be pivotable around a pivot axis PX that extends in the left-right direction (i.e., a direction orthogonal to the driving axis DX). A coupling structure between the pivotable coupling part 27 and the body housing 10 will be described in detail later.

As shown in FIGS. 2 to 5, the facing part 28 protrudes obliquely upward from the front end portion of the controller housing part 26. The facing part 28 is configured to face the grip part 21 in the front-rear direction. Specifically, the facing part 28 is configured such that a projection area of the grip part 21 from the rear overlaps a portion of the facing part 28. Thus, the facing part 28 is configured such that a straight line extending in the front-rear direction intersects the grip part 21 and the facing part 28. In this embodiment, the grip part 21 has a relatively thin (narrow) tubular shape so that the user can easily grip the grip part 21, while a width in the left-right direction of the facing part 28 is larger than an outer diameter (a width in the left-right direction) of the handle member 2. Thus, the facing part 28 protrudes leftward and rightward from the projection area of the grip part 21. In other words, when the rotary hammer 1 is viewed from behind, a portion of the facing part 28 is exposed leftward of the grip part 21, and another portion of the facing part 28 is exposed rightward of the grip part 21.

An outer surface of a rear wall part of the facing part 28 (a rear surface of the rear wall part that faces the grip part 28, which surface is hereinafter referred to as an facing surface 280) is inclined upward as it extends frontward. Thus, the facing surface 280 extends obliquely upward from the front end of an upper surface of the controller housing part 26.

The elastically coupling structure between the body housing 10 and the handle member 2 is now described in detail.

As described above, in this embodiment, the pivotable coupling part 27 of the lower extending part 25 of the handle member 2 is coupled to the body housing 10 to be pivotable relative to the body housing 10. The upper extending part 23 is coupled to the body housing 10 to be movable in the front-rear direction and is biased by an elastic member 230 away from the body housing 10 (i.e., biased rearward relative to the body housing 10).

First, the coupling structure between the pivotable coupling part 27 and the body housing 10 is described.

As shown in FIG. 3, the pivotable coupling part 27 includes a coupling shaft 271 that extends in the left-right direction. As shown in FIG. 2, a lower rear end portion of the second housing part 15 of the body housing 10 has an opening 151 that is open rearward. The pivotable coupling part 27 is inserted into the lower end portion of the second housing part 15 through the opening 151. A portion of the lower rear end portion of the second housing part 15 below the opening 151 serves as a shaft supporting part 152 that pivotably supports opposite axial end portions of the coupling shaft 271.

Figure 6:
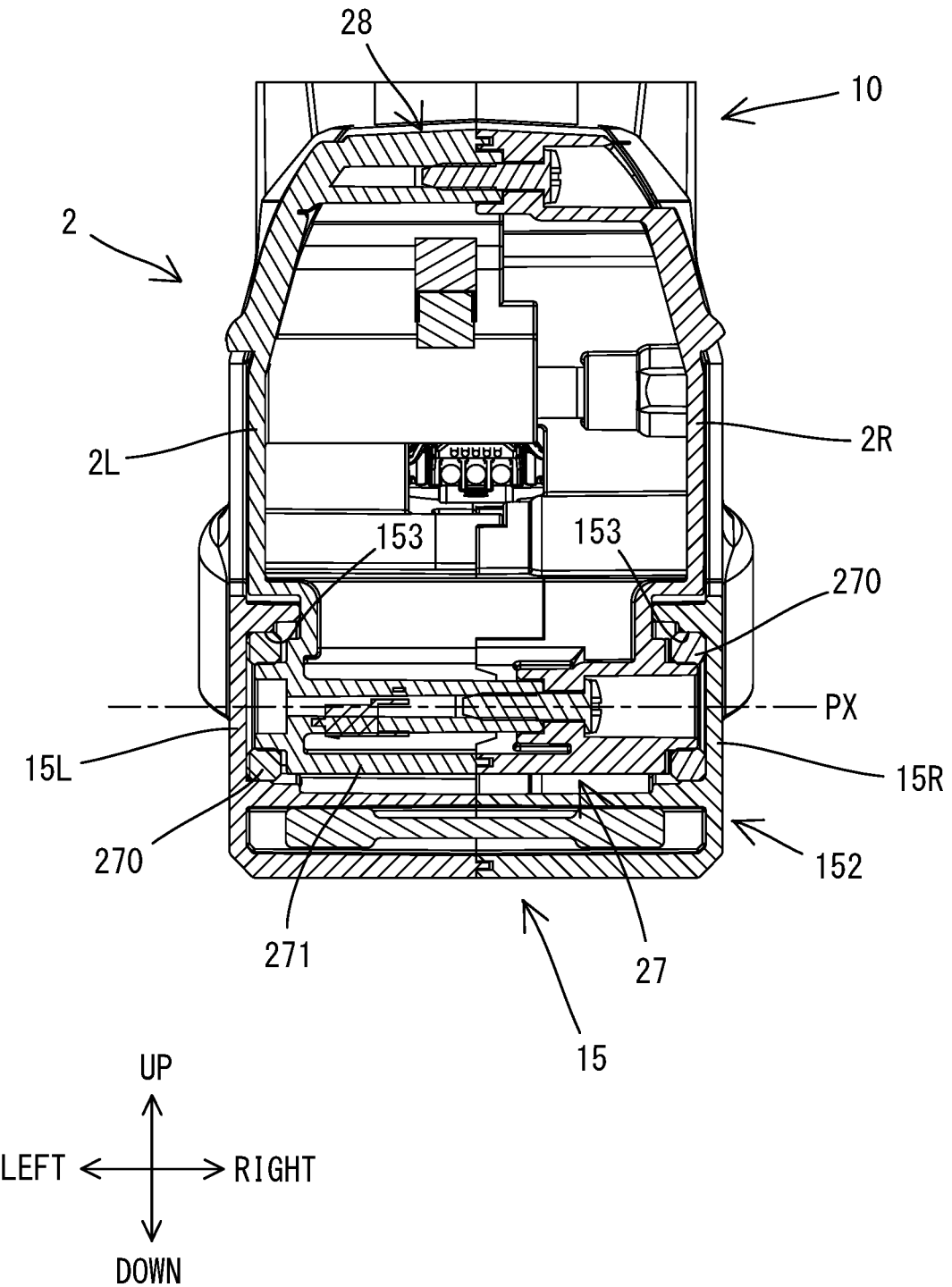
FIG. 6 is a sectional view taken along line VI-VI in FIG. 2.

As shown in FIG. 6, the shaft supporting part 152 has two recesses 153 that are formed in a left wall part (the left half 15L) and a right wall part (the right half 15R) of the second housing part 15, respectively. The opposite axial end portions of the coupling shaft 271 are disposed within the recesses 153, respectively, and are supported to be pivotable around the pivot axis PX. Contrary to this configuration, two recesses may be formed in a left wall part and a right wall part of the pivotable coupling part 27, respectively, and two protrusions may protrude into the recesses from the left wall part and the right wall part of the body housing part 10, respectively, so as to pivotably support the pivotable coupling part 27. Alternatively, the pivotable coupling part 27 and the body housing part 10 may be pivotably coupled to each other by a separate shaft.

In this embodiment, two annular elastic members 270 (O-rings) are respectively fitted around the opposite axial end portions of the coupling shaft 271, and fitted into the two recesses 153 of the second housing part 15. Thus, the coupling shaft 271 is coupled to the second housing part 15 via the two elastic members 270. Owing to this structure, the handle member 2 is not only pivotable relative to the body housing 10 around the pivot axis PX that extends in the left-right direction, but also movable in any direction that intersects the pivot axis PX. Thus, vibration transmission from the shaft supporting part 152 to the coupling shaft 271 can be reduced. However, the elastic members 270 may be omitted, and the coupling shaft 271 may be directly and pivotably supported by the shaft supporting part 152.

The coupling structure between the upper extending part 23 and the body housing 10 is now described.

Figure 7:
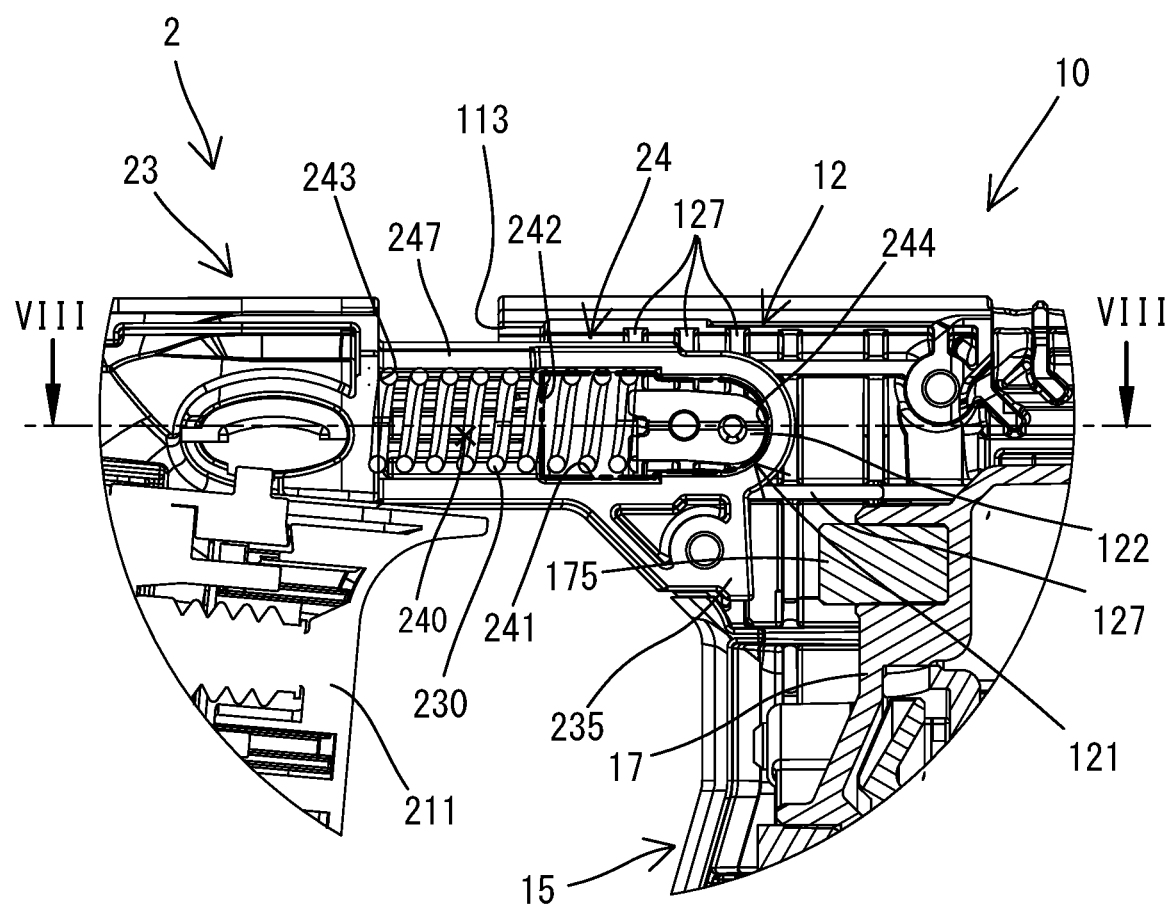
FIG. 7 is a partial, enlarged view of FIG. 2, in which the handle member is at an initial position.

As shown in FIG. 7, an upper rear end portion of the second housing part 15 of the body housing 10 has an opening 113 that is open rearward. A front half of the upper extending part 23 extends forward of the grip part 21. A portion of the front half of the upper extending part 23 is inserted into the upper rear end portion of the body housing 10 through the opening 113, and coupled to the body housing 10. Hereinafter, the front half of the upper extending part 23 is referred to as an upper coupling part 24. Further, a portion of the upper rear end portion of the second housing part 15 that extends frontward of the opening 113 and that houses the upper coupling part 24 is referred to as a handle housing part 12.

Figure 8:
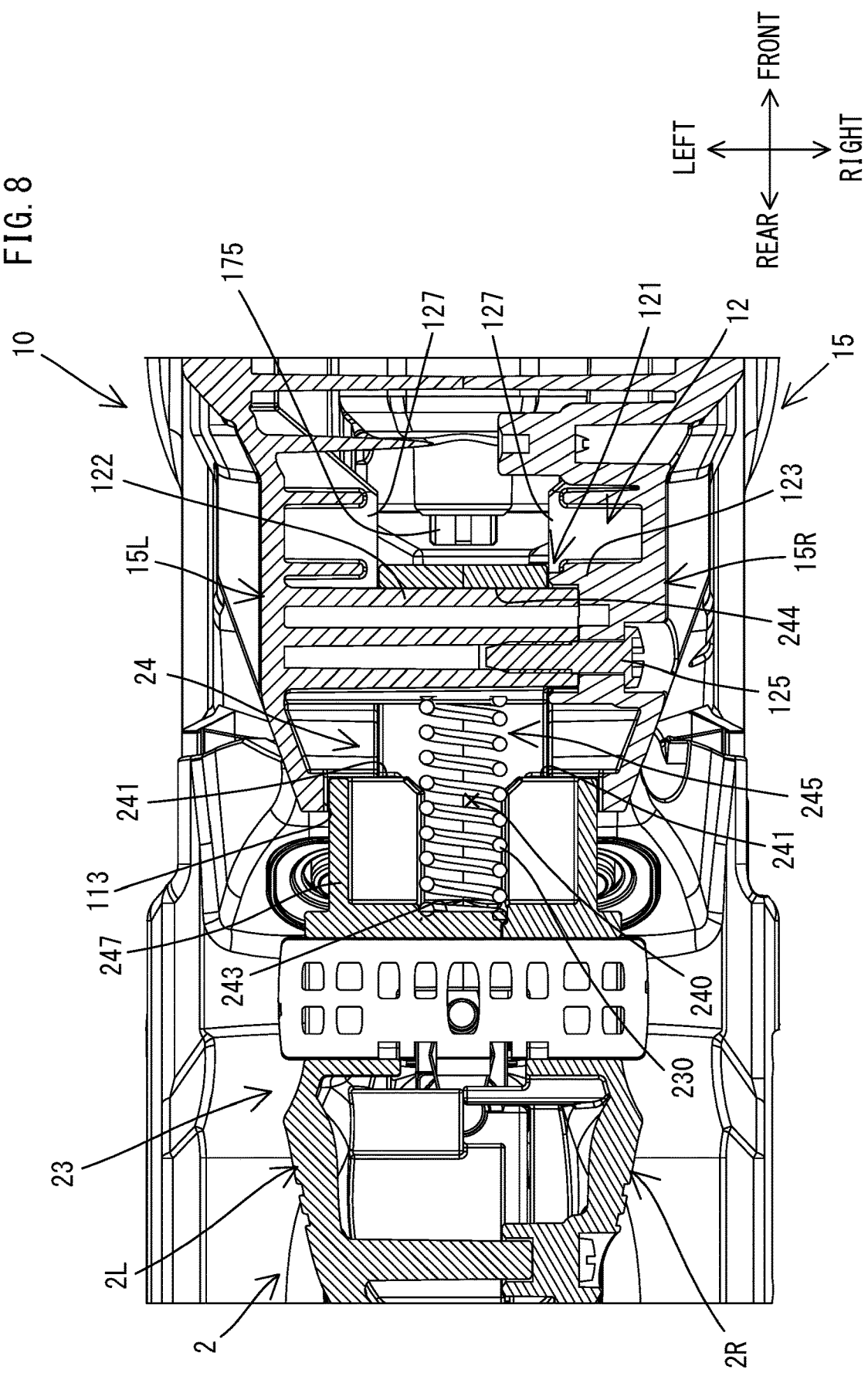
FIG. 8 is a sectional view taken along line in FIG. 7.

As shown in FIGS. 3, 7 and 8, the upper coupling part 24 is an elongate hollow body extending in the front-rear direction as a whole. The upper coupling part 24 defines an elongate internal space 240 extending in the front-rear direction. Each of a front end portion of the left wall part (the left half 2L) and a front end portion of the right wall part (the right half 2R) of the upper coupling part 24 has an openings 241 that communicates with the internal space 240 and an outside space of the upper coupling part 24. The positions of the left and right openings 241 are defined such that the left and right openings 241 communicate with a front half of the internal space 240 and the left and right openings 241 are at substantially the same location in the front-rear direction. With such a configuration, a through hole 245 that penetrates the upper coupling part 24 in the left-right direction is formed in the front half of the upper coupling part 24.

Owing to the above-described structure, the front half of the internal space 240 is open leftward and rightward through the openings 241 (communicates with the outside space) and the remaining portion of the internal space 240 is enclosed (closed). In this embodiment, the handle member 2 is formed by the left and right halves 2L and 2R that are coupled to each other. Therefore, the internal space 240 having the above-described structure can be easily formed in the handle member 2 by coupling the two halves 2L and 2R having simple structures.

As shown in FIGS. 7 and 8, a beam part 121 is disposed within the handle housing part 12. More specifically, the beam part 121 substantially extends in the left-right direction between a left wall part and a right wall part of the handle housing part 12. The beam part 121 is formed by a portion of the left half 15L and a portion of the right half 15R that are coupled to each other using a screw 125.

Specifically, the beam part 121 is formed by coupling a coupling protrusion 122 that is formed integrally with the left half 15L and a receiving part 123 that is formed integrally with the right half 15R. The coupling protrusion 122 protrudes rightward from an inner surface of the left wall part of the left half 15L. The receiving part 123 has a recess that is formed on an inner surface of the right wall part of the right half 15R. The coupling protrusion 122 penetrates (extends through) the through hole 245 (the left opening 241, the internal space 240 and the right opening 241) of the upper coupling part 24. A distal end of the coupling protrusion 122 is fitted into the receiving part 123. The screw 125 is inserted through a through hole in the receiving part 123 and screwed into a screw hole in the coupling protrusion 122. The dimension of the opening 241 in the front-rear direction is larger than the dimension of the coupling protrusion 122 in the front-rear direction. Thus, the upper coupling part 24 and the handle housing part 12 are coupled to be movable relative to each other such that the coupling protrusion 122 is movable within the opening 241.

An elastic member 230 is disposed in the internal space 240 of the upper coupling part 24. In this embodiment, a compression coil spring is employed as the elastic member 230. The elastic member 230 is disposed between the upper coupling part 24 and the coupling protrusion 122 of the handle housing part 12 such that the elastic member 230 exerts a biasing force that is substantially in parallel to the driving axis DX (i.e., in the front-rear direction).

More specifically, a rear half (a portion that is rearward of the opening 241) of the upper coupling part 24 is formed as a spring support part 247 into which the elastic member 230 is fitted. A portion of the elastic member 230 including the rear end thereof is within the spring support part 247 (i.e., in the rear half area of the internal space 240) and supported by the spring support part 247. The rear end of the elastic member 230 is in contact with a surface 243 that defines a rear end of the internal space 240. A portion of the elastic member 230 including a front end thereof is in the front half area of the internal space 240 (i.e., in the through hole 245 or an area that communicates with the outside via the openings 241). The front end of the elastic member 230 is in contact with a rear end of the coupling protrusion 122 that is in the through hole 245. Thus, the coupling protrusion 122 also functions as a spring receiver (a spring seat) that receives the front end of the elastic member 230.

The elastic member 230 biases the upper coupling part 24 and the coupling protrusion 122 (the beam part 121) in the front-rear direction such that the handle member 2 and the body housing 10 are biased away from each other. More specifically, the elastic member 230 biases the upper end portion of the handle member 2 rearward relative to the body housing 10. In an initial state in which an external force against the biasing force of the elastic member 230 is not applied to the handle member 2 and/or the body housing 10, the front end of the coupling protrusion 122 abuts (is held in contact with) a front portion of the upper coupling part 24 (specifically, a surface 244 that defines a front end of the opening 241), so that the upper end portion of the handle member 2 is prevented from further moving rearward. Thus, the coupling protrusion 122 also functions as a positioning part that defines an initial position of the handle member 2 relative to the body housing 10.

As shown in FIG. 7, in this embodiment, when the handle member 2 is at (in) the initial position (i.e., in the rearmost position relative to the body housing 10), a rear end 242 of the opening 241 of the upper coupling part 24 is located frontward of the opening 113 of the body housing 10. Thus, an entirety of the opening 241 is always within (inside) the body housing 10. Such an arrangement can reduce a possibility that dust enters the internal space 240 through the opening 241 to cause a defective operation or malfunction of the elastic member 230.

Figure 9:
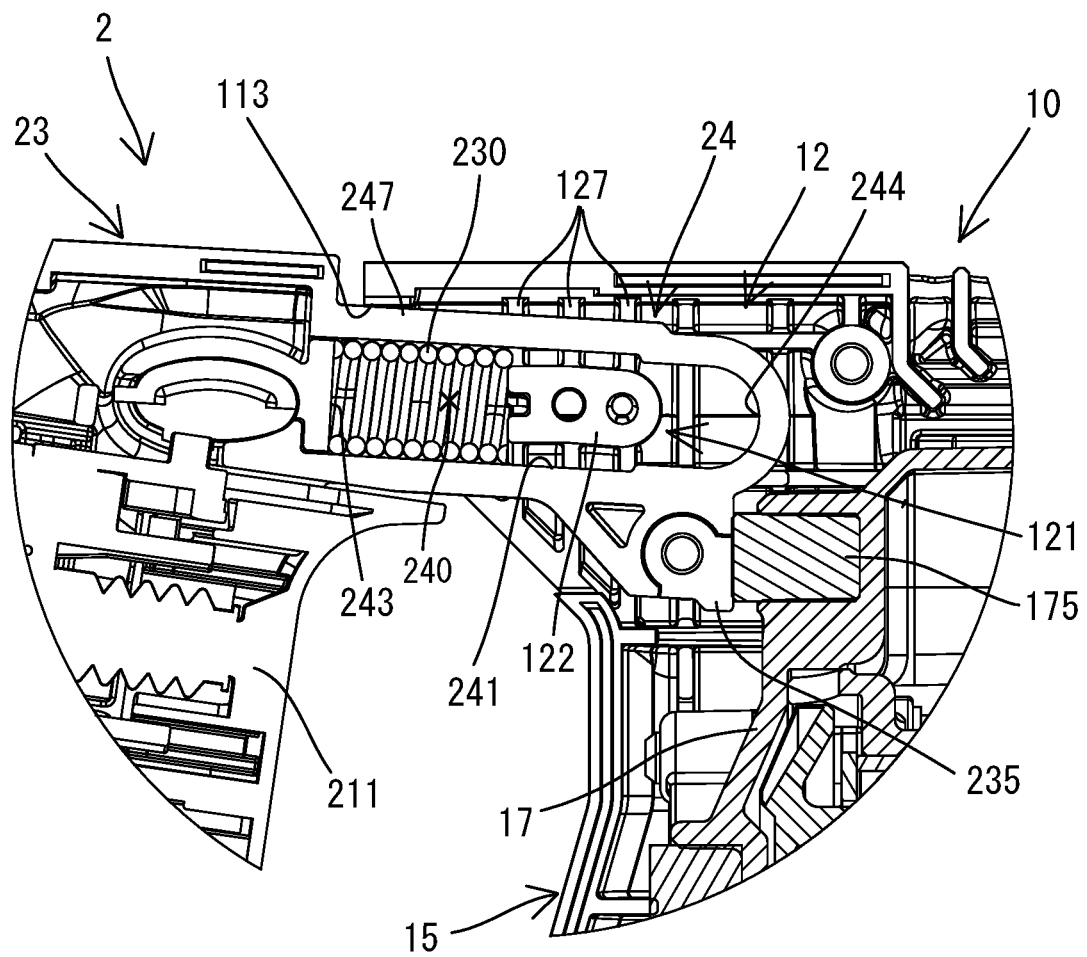
FIG. 9 is a sectional view corresponding to FIG. 7, in which the handle member is at a frontmost position.

When an external force causes the upper end portion of the handle member 2 to be moved forward relative to the body housing 10, the handle member 2 pivots around the pivot axis PX relative to the body housing 10, and thus, as shown in FIG. 9, the upper end portion of the handle member 2 moves substantially forward against the biasing force of the elastic member 230. More specifically, the coupling protrusion 122 moves rearward within the opening 241 while compressing the elastic member 230 (the compression coil spring). In this embodiment, when the handle member 2 pivots, the upper coupling part 24 moves slightly obliquely downward and forward relative to the body housing 10. Thus, the dimensions in the up-down direction of the opening 241 and the coupling protrusion 122 are determined such that the coupling protrusion 122 does not interfere with the upper coupling part 24 at this time.

In this manner, the handle member 2 and the body housing 10 move relative to each other while the biasing force of the elastic member 230 is applied thereto, to thereby reduce vibration transmission from the body housing 10 to the handle member 2. Ribs 127 protrude from the inner surfaces of the left wall part and the right wall part of the handle housing part 12. Distal ends of the ribs 127 are each substantially in contact with the outer surface of the left wall part or the right wall part of the upper coupling part 24. The ribs 127 restrict the handle member 2 from tilting in the left-right direction relative to the body housing 10 when the handle member 2 and the body housing 10 move relative to each other.

As shown in FIG. 2, in this embodiment, the upper coupling part 24 (specifically, the elastic member 230) is directly above the pivot axis PX. In other words, a straight line L that is orthogonal to the pivot axis PX and that extends in the up-down direction penetrates (extends through, intersects) the upper coupling part 24 (the elastic member 230). A tangent line of a circle around the pivot axis PX having a radius defined by a line segment between the pivot axis PX and the intersection of the straight line L and a longitudinal axis of the elastic member 230 (a compression coil spring) substantially coincides with the longitudinal axis of the elastic member 230 (an axis that extends in a direction of the biasing force of the elastic member 230). Such configuration can reduce a possibility that the elastic member 230 is subjected to undesirable stress when the handle member 2 pivots, and thus can extend the lifetime of the elastic member 230.

Further, as described above, in this embodiment, the pivotable coupling part 27 extends downward from the controller housing part 26 in the up-down direction, and thus the pivot axis PX is located below the battery mount part 261. Owing to such configuration, a distance between the elastic member 230 and the pivot axis PX is made as long as possible. Consequently, even if a stroke of the elastic member 230 is relatively large, movement of the upper coupling part 24 can be approximated to translation (linear movement) in the front-rear direction.

Further, as shown in FIGS. 7 and 9, the upper extending part 23 of this embodiment includes a contact part 235 that extends downward from the front end portion of the upper coupling part 24. Further, a contact part 175 is disposed in the rear end portion of the inner housing 17, directly in front of the contact part 235.

The contact part 175 comes into contact with (abuts) the contact part 235 of the handle member 2 from the front so as to prevent the upper end portion of the handle member 2 from further moving frontward. Thus, the contact part 175 defines the frontmost position of the handle member 2 relative to the body housing 10. In other words, the contact part 175 defines a limit of the movement of the handle member 2 relative to the body housing 10, or an upper limit of the deformation of the elastic member 2 (the maximum compression amount of the compression coil spring). Thus, the contact part 175 can prevent the elastic member 230 from being subjected to an excessive load and thus can extend the lifetime of the elastic member 230. The contact part 175 of this embodiment is made of an elastic element (for example, elastomer or synthetic resin/polymer foam). Thus, the contact part 175 can cushion an impact upon collision with the contact part 235, and suppress wear of the contact part 235.

As described above, in this embodiment, the handle member 2 and the body housing 10 are coupled to be movable relative to each other in the front-rear direction via the upper coupling part 24 and the coupling protrusion 122 that protrudes into the internal space 240 of the upper coupling part 24 through the opening 241. Further, the elastic member 230 is disposed at the rear of the coupling protrusion 122 within the internal space 240 of the upper coupling part 24. Thus, the upper coupling part 24 has a function of housing the elastic member 230, in addition to a function of coupling the handle member 2 and the body housing 10 in cooperation with the coupling protrusion 122. Owing to such configuration, the elastic member 230 and the coupling structure between the handle member 2 and the body housing 10 can fit in a space that is relatively small in the front-rear direction. Consequently, the rotary hammer 1 can be made compact in the front-rear direction. Alternatively, the handle member 2 and the body housing 10 can be designed to be movable relative to each other by a larger amount (longer distance) without enlarging the rotary hammer 1 in the front-rear direction.

In this embodiment, the coupling protrusion 122 protrudes in the left-right direction from one (specifically, the left half 15L) of the two halves 15L and 15R of the second housing part 15 of the body housing 10, and is inserted into the opening 241 in the handle member 2. Therefore, an assembler (a person who assembles the rotary hammer 1) can first place the left half 15L on a working table such that the coupling protrusion 122 protrudes upward, then position the assembled handle member 2 relative to the coupling protrusion 122 from above, and easily insert the coupling protrusion 122 into the internal space 240 through the left opening 241.

Further, in this embodiment, the beam part 121, which is the coupling portion between the two halves 15L and 15R of the second housing part 15, is utilized for coupling the body housing 10 to the upper coupling part 24. Therefore, the body housing 10 does not need to have an additional structure that is specifically provided for coupling to the upper coupling part 24. Thus, the structure of the body housing 10 can be simplified. Further, the assembler can place the handle member 2 on the left half 15L as described above, then place the right half 15R thereon, and easily connect the coupling protrusion 122 and the receiving part 123 using the screw 125.

The elements (structures) disposed within the body housing 10 are now described.

As shown in FIG. 2, the motor 31 is housed in the lower half of the second housing part 15. The motor 31 of this embodiment is a brushless motor. The motor 31 includes a motor body 310, which includes a stator and a rotor, and a motor shaft 315. The motor shaft 315 is configured to rotate integrally with the rotor around a motor axis MX. The motor shaft 315 protrudes from the rotor. In this embodiment, the motor 31 is disposed such that the motor axis MX is slightly oblique to the up-down direction of the rotary hammer 1 and intersects the driving axis DX.

The spindle 40 of this embodiment is an elongate stepped hollow cylindrical member. The spindle 40 is supported in the upper half of the first housing part 11, and extends in the front-rear direction. Further, the spindle 40 is supported to be rotatable around the driving axis DX. A front half of the spindle 40 defines the tool holder 401. The tool holder 401 is configured to removably hold the tool accessory 94 such that its longitudinal axis coincides with the driving axis DX. When the tool accessory 91 is held by the tool holder 401, the tool accessory 91 is allowed to move in the axial direction relative to the tool holder 401 and restricted from rotating around the longitudinal axis relative to the tool holder 401.

The driving mechanism 4 is operably coupled to the motor 31 (the motor shaft 315). The driving mechanism 4 is configured to drive the tool accessory 91 using the power of the motor 31. The driving mechanism 4 of this embodiment includes a hammer (striking) mechanism 41 that is configured to perform the hammer action and a rotation transmitting mechanism 46 that is configured to perform the rotary action. The hammer mechanism 41 and the rotation transmitting mechanism 46 are well-known mechanisms and thus only briefly described here.

The hammer mechanism 41 includes a motion converting mechanism 42 and a hammer (striking) element 44. The motion converting mechanism 42 is operably coupled to the motor shaft 315. The motion converting mechanism 42 is configured to convert rotation of the motor shaft 315 into linear motion along the driving axis DX for driving the tool accessory 91. In this embodiment, a well-known mechanism that includes an oscillating member 43, which is also called a swash bearing or a wobble bearing, is employed as the motion converting mechanism 42. The hammer element 44 is configured to linearly move along the driving axis DX so as to apply a striking force to the tool accessory 91, so that the tool accessory 91 is linearly driven and reciprocated. The rotation transmitting mechanism 46 is operably coupled to the motor shaft 315. The rotation transmitting mechanism 46 is configured to transmit the rotation of the motor shaft 315 to the tool holder 401 (the spindle 40). A speed reducing gear mechanism is typically employed as the rotation transmitting mechanism 46.

Although not shown and described in detail because it is a well-known structure, the rotary hammer 1 has a plurality of action modes, and includes a mode changing mechanism that is configured to change the action modes. The mode changing mechanism changes a state of the hammer mechanism 41 into an operable state only when an action mode for performing the hammer action is selected. Further, the mode changing mechanism changes a state of the rotation transmitting mechanism 46 into an operable state only when an action mode for performing the rotary action is selected.

The elements (structures) disposed within and/or on the handle member 2 are now described.

As described above, the trigger 211 is provided on the grip part 21, and the main switch 213 is housed in the grip part 21. The main switch 213 is normally OFF, and is turned ON when the trigger 211 is depressed by a user. The main switch 213 is electrically connected to the controller 30.

The controller 30 is within the controller housing part 26 of the lower extending part 25. The controller 30 includes at least a control circuit that is configured to control the operation of the rotary hammer 1. The controller 30 is electrically connected to the main switch 213, switches 7 and an indication part 8 (see FIG. 12). The switches 7 and the indication part 8 will be described in detail later. In this embodiment, the controller 30 is housed in the handle member 2 and is thus protected from vibration.

Figure 10:
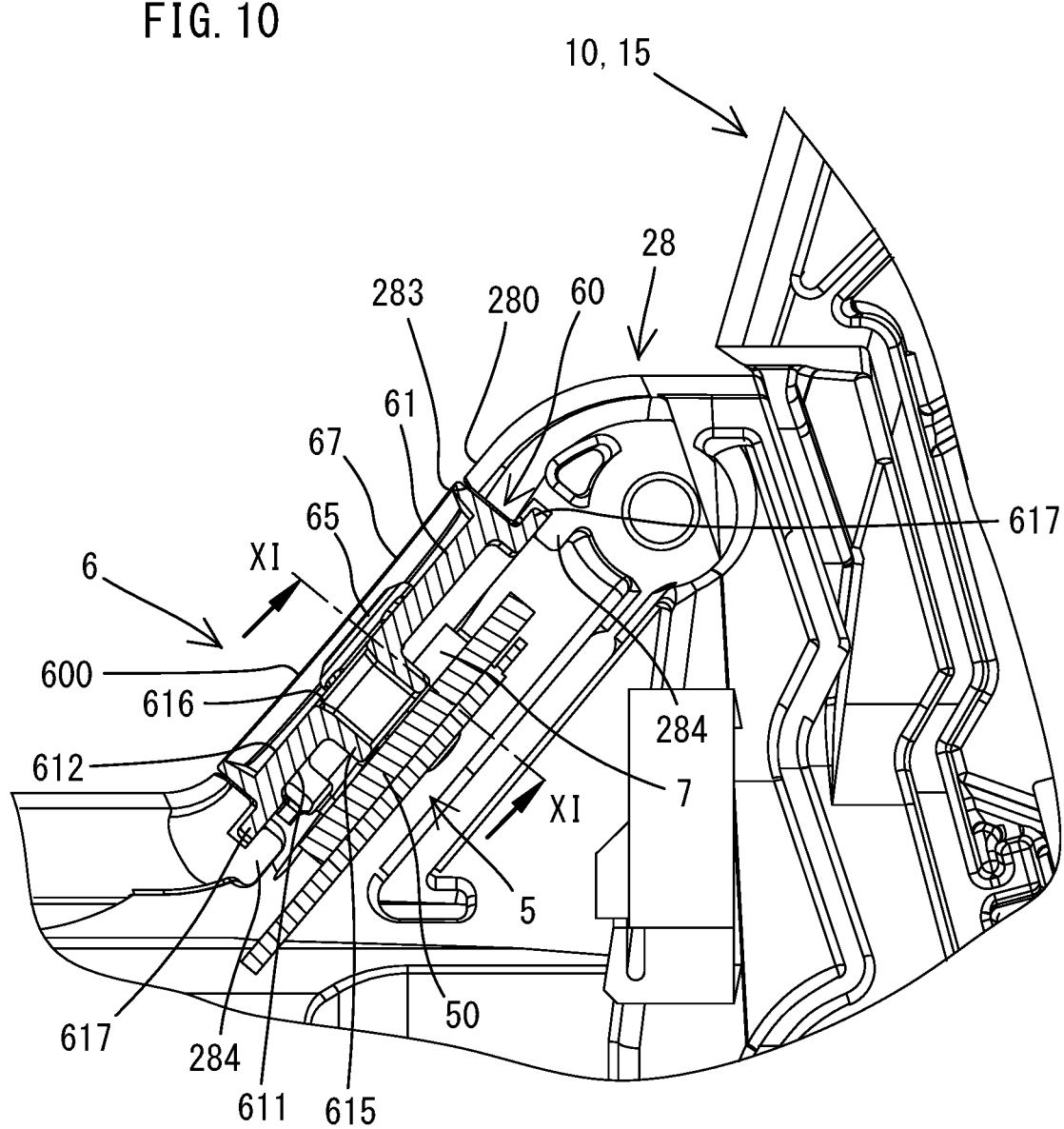
FIG. 10 is another partial, enlarged view of FIG. 2.

As shown in FIG. 1, the facing part 28 is provided with a manipulation part 6 that is configured to be manually operated (manipulated) by the user, and the indication part 8 that is configured to indicate information relating to the state of the rotary hammer 1. As shown in FIG. 10, the facing part 28 houses the switches 7 that are each configured to operate (to be switched ON and OFF) in response to the manual operation (manipulation) of the manipulation part 6.

The switches 7 are now described.

Figure 11:
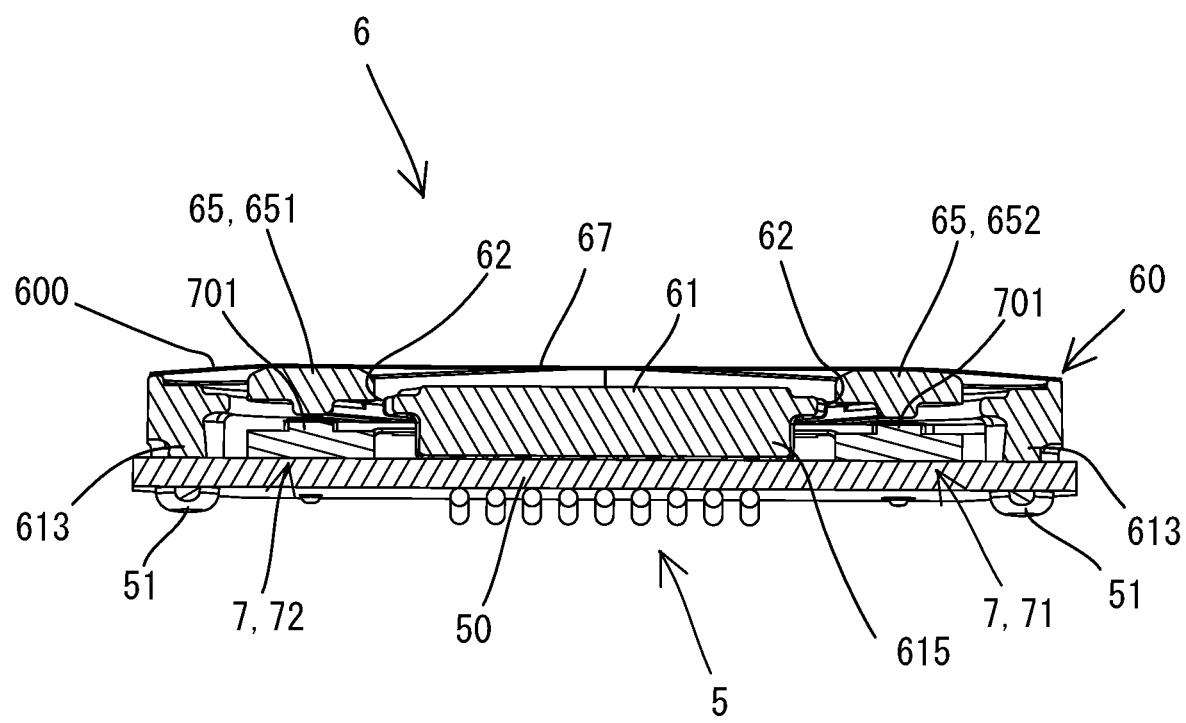
FIG. 11 is a sectional view taken along line XI-XI in FIG. 10.
Figure 12:
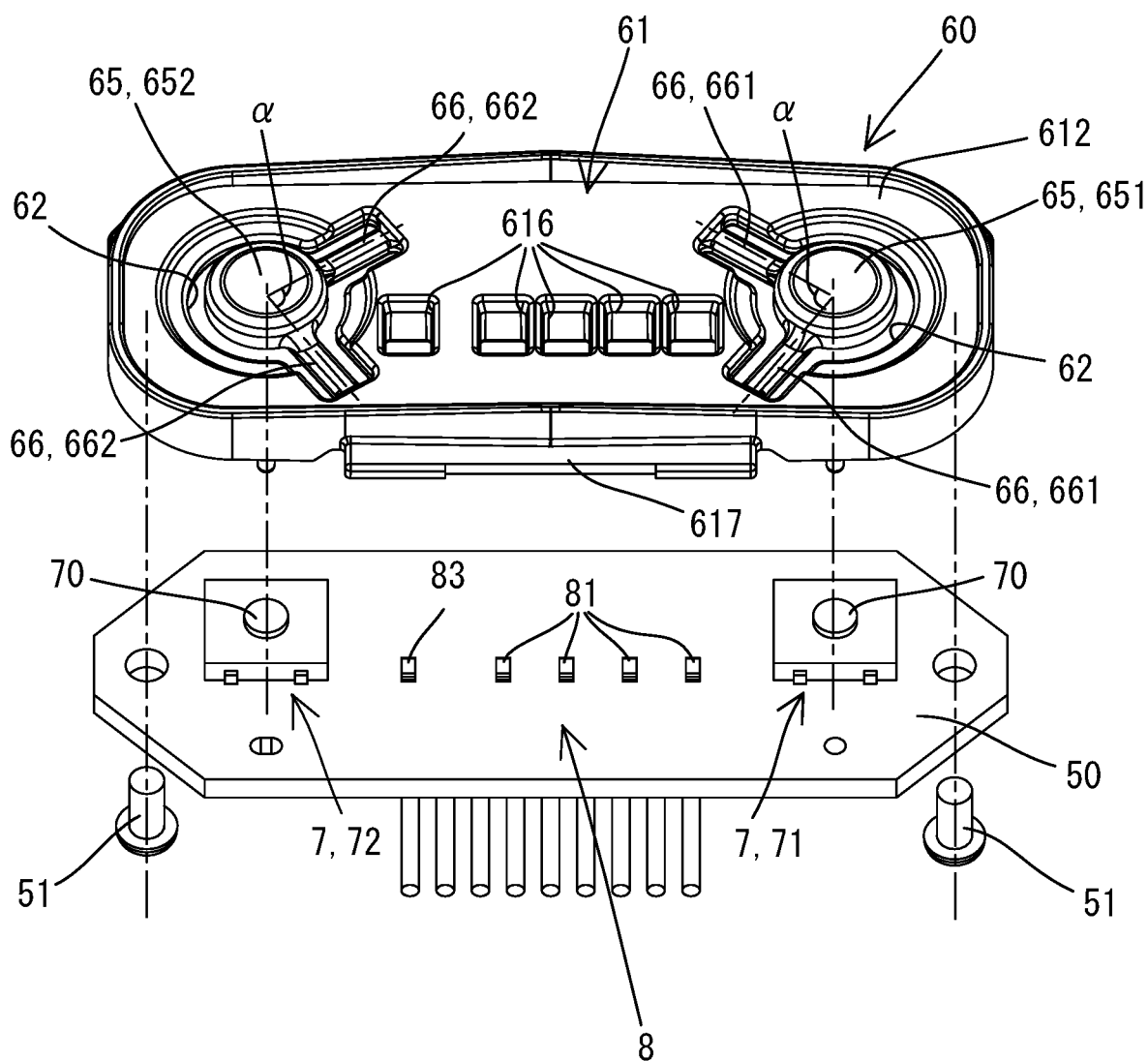
FIG. 12 is an exploded, perspective view of a switch unit.
Figure 13:
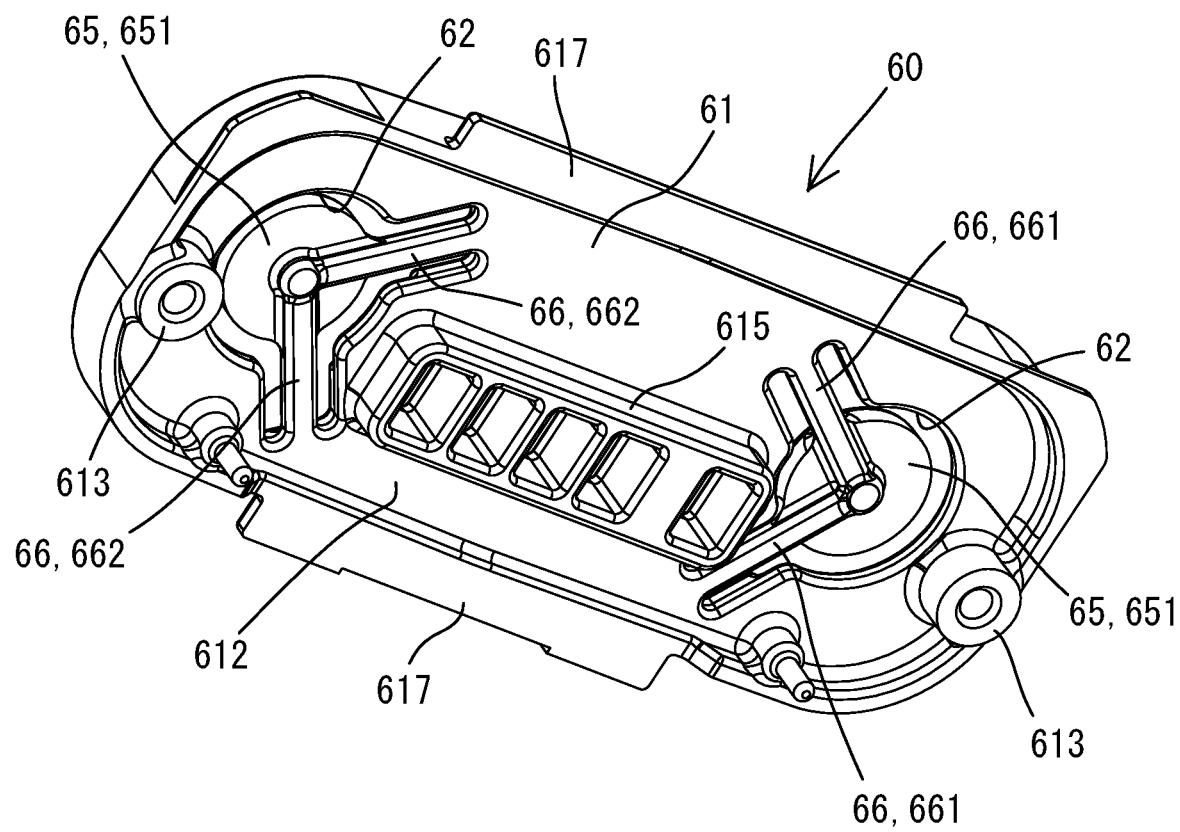
FIG. 13 is a perspective view of a manipulation panel.

As shown in FIGS. 10 to 12, in this embodiment, the rotary hammer 1 employs two switches 7 that are each configured to output signals for setting a rotation speed of the motor 31. More specifically, a first one of the two switches 7 is configured to change the present rotation speed of the motor 31 to be higher, while a second one of the two switches 7 is configured to change the present rotation speed of the motor 31 to be lower. In the following description, the two switches 7 may be collectively referred to as switches 7. When either one of the switches 7 is referred to without any distinction therebetween, it may be referred to as a switch 7. The first one of the switches 7 for increasing the rotation speed of the motor 31 may be referred to as a first switch 71. The second one of the switches 7 for reducing the rotation speed of the motor 31 may be referred to as a second switch 72.

Each of the two switches 7 of this embodiment is a push switch that includes a push button 70. More specifically, the switch 7 is a push-button type momentary switch (a so-called tactile switch) that is normally kept OFF and is turned ON only while it is depressed. The switches 7 are each configured to output a specified digital signal to the controller 30 (see FIG. 2) when turned ON.

In this embodiment, the maximum rotation speed of the motor 31 is changeable stepwise in four grades, that is, from grade 1 to grade 4. When the controller 30 receives the signal from the first switch 71, the controller 30 changes the present maximum rotation speed of the motor 31 to a maximum rotation speed that corresponds to a grade that is one grade higher. Similarly, when the controller 30 receives the signal from the second switch 72, the controller 30 changes the present maximum rotation speed of the motor 31 to a maximum rotation speed that corresponds to a grade that is one grade lower. The controller 30 controls the rotation speed of the motor 31 based on the set maximum rotation speed and an operation amount (a depressing amount) of the trigger 211.

In this embodiment, the two switches 7 are mounted on a common circuit board 50. The switches 7 are electrically connected to the controller 30 via wires connected to the circuit board 50. The circuit board 50 has an elongate shape corresponding to a manipulation panel 60 of the manipulation part 6. The circuit board 50 is fixed to the manipulation panel 60 to form an integral (single) unit. The first switch 71 is on a right end portion of the circuit board 50, while the second switch 72 is on a left end portion of the circuit board 50, spaced apart from the first switch 71.

The indication part 8 is now described.

The indication part 8 of this embodiment is configured to indicate information relating to the present maximum rotation speed of the motor 31 and information relating to the present action mode, as the information relating to the state of the rotary hammer 1. More specifically, as shown in FIG. 12, the indication part 8 includes four LEDs 81 for indicating the information relating to the maximum rotation speed of the motor 31 and one LED 83 for indicating the information relating to the action mode. Each of the LEDs 81 and 83 is mounted on the common circuit board 50 on which the switches 7 are also mounted. The LEDs 81 and 83 are connected to the controller 30 via wires connected to the circuit board 50.

The four LEDs 81 are aligned in the left-right direction on a straight line between the first switch 71 and the second switch 72. The four LEDs 81 correspond to the four grades (grade 1 to 4) of the maximum rotation speed of the motor 31, starting from the left side. The controller is configured to light one of the four LEDs 81 according to the grade of the rotation speed that is set as described above.

The LED 83 is disposed between the leftmost LED 81 and the second switch 72 on the left end portion of the circuit board 50. The controller 30 is configured to light the LED 83 when a specified action mode is selected.

The manipulation part 6 is now described.

The manipulation part 6 covers the switches 7 and is configured to allow the push buttons 70 of the switches 7 to be externally depressed by the user. More specifically, as shown in FIGS. 1 and 10, the manipulation part 6 of this embodiment is continuous with the outer surface (the facing surface 280) of the facing part 28. Thus, an outer surface 600 of the manipulation part 6 and the facing surface 280 are substantially in the same plane. In other words, there is no substantial step (difference in level) between the outer surface 600 of the manipulation part 6 and the facing surface 280. Here, the term "plane" covers not only a flat plane but also a plane that is at least partially curved. Further, the plane may have a minute step or minute steps.

As shown in FIG. 10, the manipulation part 6 of this embodiment includes the manipulation panel 60 that includes buttons 65, each of which is displaceable (movable) in response to the depressing operation by the user, and a flexible sheet 67 that covers the manipulation panel 60 from the outside thereof.

As shown in FIGS. 10 to 13, the manipulation panel 60 includes a base part 61, and two buttons 65 that are supported by the base part 61.

The base part 61 basically has a generally rectangular flat plate-like shape. The manipulation panel 60 is disposed such that a longitudinal direction of the base part 61 substantially coincides with the left-right direction of the rotary hammer 1. The circuit board 50 is fixed to base part 61 such that a first surface of the circuit board 50 on which the switches 7 and the LEDs 81 and 83 of the indication part 8 are mounted faces one surface of the base part 61.

More specifically, two protrusions 613 each having a screw hole protrude from the one surface of the base part 61. The circuit board 50 has two through holes corresponding to the two protrusions 613. The circuit board 50 is fixed to the base part 61 using screws 51 in a state in which the first surface of the circuit board 50 is in contact with distal end surfaces of the protrusions 613. Thus, the circuit board 50, the switches 7, the indication part 8 and the manipulation part 6 are integrated to form a single unit (an assembly) (hereinafter also referred to as a switch unit 5). The base part 61 is substantially in parallel to the circuit board 50. The base part 61 is spaced apart from the switches 7 and the LEDs 81 and 83 of the indication part 8. In the following description, the one surface of the base part 61 that faces the circuit board 50 is referred to as an inner surface 611, while the other surface of the base part 61 (a surface opposite from the circuit board 50) is referred to as an outer surface 612.

Each of the buttons 65 is disposed in a hole formed in the base part 61 and is coupled to the base part 61 via two arm parts 66. More specifically, two holes 62 are formed in a left end portion and a right end portion of the base part 61, respectively. Each of the holes 62 penetrates (extends through) the base part 61 in a thickness direction of the plate-like base part 61. The two buttons 65 are disposed at central areas of the two holes 62, respectively. The holes 62 and the buttons 65 of this embodiment each have a circular shape. The hole 62 and the corresponding button 65 are concentric with each other. The positions of two holes 62 and the two buttons 65 are determined such that central portions of the two buttons 65 respectively face the push buttons 70 of the two switches 7 that are mounted on the circuit board 50. In an initial state in which an external force is not applied to the button 65, the button 65 is spaced apart from the push button 70 of the switch 7.

Each of the two arm parts 66 that couple the button 65 and the base part 61 is shaped like a bar or rod. Each arm part 66 extends radially outward from an outer edge of the button 65 within the hole 65 of the base part 61 and is connected to the base part 61. In this embodiment, the base part 61, the buttons 65, and the arm parts 66 are integrally molded from synthetic resin (plastic, polymeric material). Thus, the manipulation panel 60 is an integrally molded plastic component.

Each arm part 66 is flexible (resilient, elastically deformable) relative to the base part 61 in a facing direction in which the base part 61 and the circuit board 50 face each other (a direction that is substantially orthogonal to the inner surface 611). Each of the holes 62 has two protruding areas that protrude radially outward. The two arm parts 66 respectively extend from the button 65 into these two protruding areas, and are connected to the base part 61. This structure can secure an appropriate length of each arm part 66 while minimizing a gap between the button 65 and the base part 61, and thus facilitates deformation of the arm part 66. When the button 65 is depressed and thus the arm parts 66 are flexed (elastically deformed), the button 65 moves toward the circuit board 50 and presses the push button 70 of the corresponding switch 7, so that the switch 7 is turned ON.

An angle a between the two arm parts 66 corresponding to each button 65 is preferably in a range of 60 to 90 degrees. This range is determined based on the fact that (i) operability (maneuverability) of the button 65 is deteriorated as the angle a becomes larger than 90 degrees, and (ii) the arm parts 66 are more easily twisted when the button 65 is depressed as the angle a becomes smaller than 60 degrees.

The twisting (torsion) of the arm parts 66 causes a shift in a moving direction of the central portion of the button 65 relative to a straight line between the button 65 in the initial position and the push button 70 of the switch 7, and thus the button 65 may fail to turn the switch 7 ON (i.e., may cause malfunction). In view of the operability of the button 65 and the push button 65 of the switch 7 and suppression of the torsion of the arm parts 66, it is the most preferable if the angle α is 90 degrees. Thus, in this embodiment, the angle a between the two arm parts 66 is substantially 90 degrees.

In the following depiction, the two buttons 65 may be collectively referred to as buttons 65. When either one of the buttons 65 is referred to without distinction, it may be referred to as a button 65. A right one of the two buttons 65 may be referred to as a first button 651. A left one of the two buttons 65 may be referred to as a second button 652. Further, the arm parts 66 that correspond to the first button 651 and the arm parts 66 that correspond to the second button 652 may be collectively referred to as arm parts 66. When any one of the arm parts 66 is referred to without distinction, it may be referred to as an arm part 66. The two arm parts 66 that correspond to the first button 651 may be referred to as first arm parts 661, while the other two arm parts 66 that correspond to the second button 652 may be referred to as second arm parts 662.

The two first arm parts 661 that connect the right, first button 651 and the base part 61 are spaced further apart from each other (i.e., a gap between the two first arm parts 661 becomes larger) as the first arms 661 extend from the first button 651 toward the second button 652 (i.e., toward the center in the left-right direction of the base part 61 or toward the left side of the base part 61). Thus, the two first arm parts 661 extend leftward away from each other to form a V-shape. The two second arm parts 662 that connect the left, second button 652 and the base part 61 are spaced further apart from each other (i.e., a gap between the two second arm parts 662 becomes larger) as the second arms 662 extend from the second button 652 toward the first button 651 (i.e., toward the center in the left-right direction of the base part 61 or toward the right side of the base part 61). Thus, the two second arm parts 662 extend rightward away from each other to form a V-shape.

Owing to this configuration, the first button 651 and the second button 652 can be as close as possible to the left end and the right end of the manipulation panel 60 (the base part 61), respectively. As described above, the facing part 28 protrudes leftward and rightward of the projection area of the grip part 21 from the rear. Each of the first button 651 and the second button 652 is at least partially outside the projection area in the left-right direction. Thus, when the rotary hammer 1 is viewed from the rear, a portion of the first button 651 is exposed rightward of the grip part 21, and a portion of the second button 652 is exposed leftward of the grip part 21 (see FIG. 5).

A protrusion 615 protrudes from the inner surface 611 of the base part 61 toward the circuit board 50. The protrusion 615 is disposed between the two holes 62 in the left-right direction. The protrusion 615 has five light passages that correspond to the LEDs 81 and 83, respectively, and that lead the lights of the LEDs 81 and 83 to five openings 616 of the base part 61 that are open in the outer surface 612.

As shown in FIG. 10, in this embodiment, the manipulation panel 60 is supported by the facing part 28, so that an entirety of the switch unit 5 is supported by the facing part 28. More specifically, the manipulation panel 60 includes a pair of protruding pieces 617 that protrude from edges corresponding to a pair of long sides of the base part 61 substantially in parallel to the inner surface 611. The rear wall part of the facing part 28 has an opening 283 having a shape that corresponds to the manipulation panel 60. Ribs 284 are disposed adjacent to the upper end (the front end) and the lower end (the rear end) of the opening 283 within the facing part 28. The manipulation panel 60 is supported by the facing part 28 in a state in which the base part 61 is fitted into the opening 283 and the two protruding pieces 617 are fitted between the rear wall part and the ribs 284. The base part 61 is fitted into the opening 283 without a gap. This structure reduces a possibility that dust enters the inside of the handle member 2 through the opening 283.

As shown in FIGS. 10 and 11, the flexible sheet 67 is attached to the manipulation panel 60 so as to entirely cover the outer surface 612 of the base part 61 and the buttons 65 of the manipulation panel 60. More specifically, the flexible sheet 67 is bonded to the outer edge portion of the base part 61 and thus integrated with the manipulation panel 60. An outer surface of the flexible sheet 67 is substantially in the same plane with the facing surface 280 i.e., (the outer surface of the facing part 28). The outer surface of the flexible sheet 67 forms the outer surface 600 of the manipulation part 6. The flexible sheet 67 covers the holes 62 of the manipulation panel 60, so that dust is prevented from entering the inside of the handle member 2 through the holes 62 of the manipulation part 6.

The flexible sheet 67 is a synthetic resin (plastic, polymeric) sheet having flexibility. The material of the flexible sheet 67 is not especially limited. Examples of the material of the flexible sheet 67 may include polyethylene terephthalate (PET), and polycarbonate.

As shown in FIG. 1, symbols (signs) and/or characters that relate to the types of the switches 7 and the information that are indicated by the indication part 8 are marked on the outer surface 600 of the flexible sheet 67. In this embodiment, a mark 671 of a plus (+) button that indicates increasing the rotation speed is provided at a position that corresponds to the first switch 7 and the first button 651. Further, a mark 672 of a minus (−) button that indicates reducing the rotation speed is provided at a position that corresponds to the second switch 72 and the second button 652. These marks 671 and 672 may be formed by emboss processing.

Further, the flexible sheet 67 has five windows 675 that are formed at positions that respectively correspond to the LEDs 81 and 83 of the indication part 8 (and the openings 616 of the base part 6). The windows 675 let the lights of the LEDs 81 and 83 through. Thus, the user can visually check the lights of the LEDs 81 and 83 through the openings 616 (see FIG. 12) and the windows 675.

As described above, the switches 7 are housed in the handle member 2, which is coupled to the body housing 10 via the elastic members 230 and 270, and thus protected from vibration. The manipulation part 6, which is manually operated (manipulated) for turning the switch 7 ON, is continuous with the outer surface of the handle member 2 (specifically, with the facing surface 280). Thus, unlike a known manipulation part of a pivot type or a slide type (for example, a dial or a slide lever), the manipulation part 6 does not substantially protrude from the outer surface of the handle member 2 (the facing surface 280). This structure can reduce a possibility that the manipulation part 6 is unexpectedly depressed by a hand of the user or some object to turn the switch 7 ON. Further, the manipulation part 6 of this embodiment is less likely to generate a gap between the manipulation part 6 and the handle member 2, compared to the manipulation part of the pivot type or the slide type.

Therefore, dust is less likely to enter into the handle member 2 through the gap, so that the possibility of the malfunction of the switch 7 can be reduced.

The manipulation part 6 of this embodiment is provided at the facing part 28 of the handle member 2 that faces the grip part 21 in the front-rear direction. Therefore, the user can easily operate the manipulation part 6 from the rear while gripping the grip part 21. In particular, the manipulation part 6 is continuous with the facing surface 280 that is inclined upward toward the front. Such configuration can enhance operability of the manipulation part 6. Further, the user can visibly check a portion of the first button 651 and a portion of the second button 652 from behind the grip part 21. Therefore, the user can easily manipulate the first button 651 and the second button 652.

Further, in this embodiment, the lights of the LEDs 81 and 83 of the indication part 8 are visually recognizable through the windows 675 of the flexible sheet 67. The indication part 8 is between the first button 651 and the second button 652 in the left-right direction, and thus the user can easily visually check the information (the grade of the rotation speed, and the action mode) that is indicated by the LEDs 81 and 83 together with the manipulation part 6.

Correspondences between the components (features) of the above-described embodiment and the components (features) of the present disclosure or the present invention are as follows. However, the components of the embodiment are merely exemplary, and do not limit the components of the present disclosure or the present invention.

The rotary hammer 1 is an example of a "reciprocating tool". The hammer mechanism 41 is an example of a "reciprocating mechanism". The elastic member 230 is an example of an "elastic member". The upper coupling part 24 of the handle member 2 is an example of a "first coupling part". The coupling protrusion 122 of the body housing 10 is an example of a "second coupling part". The left and right halves 2L and 2R are an example of "two handle halves". The left and right halves 15L and 15R are an example of "two housing halves". The opening 113 is an example of a "rear end opening". The shaft supporting part 152 of the body housing 10 is an example of a "third coupling part". The coupling shaft 271 is an example of a "fourth coupling part".

The above-described embodiment is merely exemplary, and the reciprocating tool according to the present disclosure is not limited to the rotary hammer 1 of the above-described embodiment. For example, the following non-limiting modifications may be made. Further, at least one of these modifications may be employed in combination with at least one of the rotary hammer 1 of the above-described embodiment and the claimed features.

For example, the reciprocating tool according to the present disclosure may be embodied as a power tool having a hammer (striking) mechanism that is configured to perform only the hammer action (e.g., an electric hammer (a demolition hammer or a scraper)), or a reciprocating cutting tool that is configured to reciprocate a tool accessory (e.g., a blade) so as to perform a cutting operation (e.g., a reciprocating saw).

The structures and/or arrangements of the motor and/or the reciprocating mechanism in the reciprocating tool may be appropriately changed from those described in the above-described embodiment. For example, the motor may be disposed such that the motor axis orthogonally intersects the driving axis, or extends in parallel to the driving axis.

Further, for example, a well-known mechanism that includes a crank shaft may be employed as the reciprocating mechanism.

The structure of the body housing and/or the handle member, and a manner of coupling the body housing and the handle member are not limited to the example in the above-described embodiment. For example, the body housing need not necessarily have an L-shape. Further, an entirety of the body housing may be formed by two halves that are originally divided in the left-right direction and coupled to each other. For example, the handle member may be a cantilever type handle member of which only one end portion of the handle member is coupled to the body housing. Both of two end portions of a handle member having a U-shape may be coupled to a body housing to be movable substantially in the front-rear direction only, relative to the body housing. In this modification, each of the two end portions of the handle member may be coupled to the body housing via a coupling structure that is similar or substantially identical to the coupling structure including the upper coupling part 24, the coupling protrusion 122 and the elastic member 230 in the above-described embodiment.

As an elastic member that is interposed between the body housing and the handle member, a different type of spring, elastomer, synthetic resin (plastic, polymeric) foam, etc. may be employed in place of the compression coil spring in the above-described embodiment.

Further, in view of the nature of the present invention, the above-described embodiment and the modifications thereof, the following Aspects A1 to A7 can be provided. Any one or more of the following Aspects A1 to A7 can be employed in combination with any one or more of the above-described embodiment, the above-described modifications and the claimed features.

(Aspect A1)

A contact part is disposed within the body housing, and
the contact part is configured to define the frontmost position of the handle member relative to the body housing by coming into contact with (abutting) the handle member when the handle member moves frontward from the initial position relative to the body housing.

The contact part 175 is an example of the "contact part" of this aspect.

(Aspect A2)

The contact part is formed by a second elastic member.

(Aspect A3)

A third elastic member is disposed (interposed) between the third coupling part and the fourth coupling part.

The elastic member 270 is an example of the "third elastic member" of this aspect.

(Aspect A4)

The handle member includes a battery mount part that is disposed below the grip part in the up-down direction.

(Aspect A5)

The reciprocating tool further includes a controller that is configured to control driving of the motor, and
the controller is disposed within the handle member and between the grip part and the battery mount part in the up-down direction.

(Aspect A6)

The elastic member is disposed behind the protrusion in the internal space in the front-rear direction.

(Aspect A7)

At least a portion of the body housing is formed by two housing halves that are coupled in a left-right direction that is orthogonal to the front-rear direction and the up-down direction, and
the second coupling part is a protrusion that protrudes from a first one of the two housing halves toward a second one of the two housing halves.

The following Aspects B1 to B15 can be provided for another non-limiting object to provide improvement in a manipulation part of a power tool with a hammer mechanism (striking mechanism) having a vibration-isolating structure. Any one of the following Aspects B1 to B15 can be employed alone, or two or more of them can be employed in combination with each other. Alternatively, any one or more of the following Aspects B1 to B15 can be employed in combination with at least one of the rotary hammer 1 of the above-described embodiment, the above-described modifications, the above-described Aspects A1 to A7 and the claimed features.

(Aspect B1)

A power tool comprising:
a motor;
a hammer mechanism that is operably coupled to the motor and is configured to linearly drive a tool accessory along a driving axis that defines a front-rear direction of the power tool;
a body housing that houses the motor and the hammer mechanism;
a handle member that (i) is coupled to the body housing via at least one elastic member and (ii) includes a grip part that is disposed rearward of the body housing to extend in an up-down direction that intersects the driving axis;
a manipulation part that (i) is configured to be manually operated (manipulated) by a user and (ii) is continuous with an outer surface of the handle member; and
at least one switch that (i) is disposed within the handle member and (ii) is configured to be switched between ON and OFF in response to a manual operation of the manipulation part.

In the power tool according to this aspect, the at least one switch is housed within the handle member that is coupled to the body housing via at least one elastic member. Therefore, the at least one switch can be effectively protected from vibration. Further, the manipulation part is continuous with the outer surface of the handle member. In other words, the manipulation part and the outer surface of the handle member are substantially in a same plane. The "outer surface" may be formed as, not only a flat surface, but also a surface that is at least partially curved. Thus, unlike a knwon manipulation part of a pivot type or a slide type (e.g., a dial, a trigger, a rocker switch, a toggle switch, a switch lever, a slide lever, etc.), the manipulation part of this aspect does not substantially protrude from the outer surface of the handle member. Therefore, a possibility can be reduced that the manipulation part is unexpectedly operated and thus the at least one switch is turned ON. Further, the manipulation part of this aspect is less likely to generate a gap between the manipulation part and the handle member, compared to the manipulation part of the pivot or slide type. Consequently, a possibility can be reduced that dust enters inside the handle member, which may lead to malfunction of the at least one switch.

The "switch" of this aspect may be a mechanical switch having a mechanical contact, or an electronic switch that electronically opens and closes a circuit using an electron tube or a semiconductor device. At least a portion of the manipulation part and at least a portion of the at least one switch may be integrated.

(Aspect B2)

The power tool as defined in Aspect B1, wherein the manipulation part is continuous with a facing surface of the handle member that faces the grip part.

According to this aspect, the manipulation part can be disposed at a position where the user can easily manipulate the manipulation part from the rear while gripping the grip part.

(Aspect B3)

The power tool as defined in Aspect B2, wherein the facing surface is inclined upward as the facing surface extends forward.

According to this aspect, the operability of the manipulation part can be further improved.

(Aspect B4)

The power tool as defined in Aspect B2 or B3, wherein a portion of the handle member between the grip part and the facing part includes a battery mount part that is configured to removably hold a battery.

According to this aspect, chattering that is caused when the battery is mounted to the battery mount part can be reduced, compared to a structure in which the body housing includes the battery mount part. Further, mass of the battery is added to mass of the handle member when the battery is mounted to the battery mount part, so that the vibration of the handle member can be further reduced.

(Aspect B5)

The power tool as defined in any one of Aspects B1 to B4, further comprising:
  a controller that is configured to control driving of the motor,
  wherein the at least one switch is configured to output a signal for setting a rotation speed of the motor to the controller in response to the manual operation of the manipulation part.

According to this aspect, the use can easily change the rotation speed of the motor during the operation of the power tool, so that the usability of the power tool can be improved.

(Aspect B6)

The power tool as defined in Aspect B5, wherein:
  the at least one switch includes:
    a first switch that is configured to output a signal for increasing the rotation speed of the motor to the controller, and
    a second switch that is configured to output a signal for reducing the rotation speed of the motor to the controller,
  the manipulation part includes:
    a first button that is configured as a push button that is configured to move in response to a depressing operation thereon to turn the first switch ON, and
    a second button that is configured as a push button that is configured to move in response to a depressing operation thereon to turn the second switch ON, and
  each of the first button and the second button is at least partially disposed outside a projection area of the grip part when the grip is projected from the rear.

According to this aspect, the use can visually check at least a portion of each of the first button and the second button from behind the grip part, and thus the user can easily manipulate the first button and the second button.

(Aspect B7)

The power tool as defined in any one of Aspects B1 to B6, further comprising:
  an indication part that is configured to visually indicate information relating to a state of the power tool.

According to this aspect, the user can view the information that is indicated by the indication part to recognize the state of the power tool. Examples of the indication part may include an LED that indicates information using light, and a display that indicates information by displaying characters and/or symbols (signs). The information to be indicated is not specifically limited. Examples of the information may include information relating to a present rotation speed of the motor, and information relating to a present action mode of the power tool.

(Aspect B8)

The power tool as defined in Aspect B7 depending from Aspect B6, wherein:
  the first button and the second button are spaced apart from each other, and
  the indication part is disposed in a visible manner between the first button and the second button.

According to this aspect, the indication part is at a position where the user can easily visually check the indication part together with the manipulation part.

(Aspect B9)

The power tool as defined in any one of Aspects B1 to B8, wherein:
  the manipulation part includes a manipulation panel that is disposed between the at least one switch and the outer surface of the handle member,
  the manipulation panel includes (i) a plate-like base part, and (ii) at least one push button that is configured to move in response to a depressing operation thereon to turn the at least one switch ON, and
  each of the at least one push button is disposed in a hole formed in the base part and is coupled to the base part by at least two flexible arm parts.

(Aspect B10)

The power tool as defined in Aspect B9, wherein:
  the at least one switch includes a first switch and a second switch,
  the at least one push button includes a first button that corresponds to the first switch, and a second button that corresponds to the second switch,
  the first button is disposed in a first hole formed in the base part and is coupled to the base part by two flexible first arm parts,
  the second button is disposed in a second hole formed in the base part and is coupled to the base part by two flexible second arm parts,
  the first button and the second button are spaced apart from each other in a left-right direction that is orthogonal to the front-rear direction and the up-down direction,
  the two first arm parts extend to be spaced further apart from each other as the two first arm parts extend from the first button toward the second button in the left-right direction, and
  the two second arm parts extend to be spaced further apart from each other as the two second arm parts extend from the second button toward the first button in the left-right direction.

According to this aspect, each of the push buttons can move to turn the corresponding switch ON, in response to flexing of the corresponding two arm parts. This configuration can suppress torsion of the arm parts when the push button is depressed, and thus a positional shift of the push button relative to the switch, compared to a configuration in which the push button is coupled to the base part via only one arm part. Therefore, the push button can more reliably turn the corresponding switch ON.

(Aspect B11)

An outer surface of the manipulation part and the outer surface of the handle member are substantially in the same plane.

(Aspect B12)

The handle member includes (i) an upper coupling part that couples an upper end portion of the grip part and the body housing, and (ii) a lower coupling part that couples a lower end portion of the grip part and the body housing, and a front end portion of the lower coupling part is provided with the manipulation part.

(Aspect B13)

The manipulation part includes a flexible sheet that covers the manipulation panel from the outside thereof.

(Aspect B14)

The battery mount part is disposed in a lower end portion of the lower coupling part.

(Aspect B15)

The controller is housed in the handle member.

The above-described embodiment is merely exemplary, and the power tool having a hammer mechanism according to the Aspects B1 to B15 of the present disclosure is not limited to the rotary hammer 1 of the above-described embodiment. For example, the following non-limiting modifications may be made. Further, at least one of these modifications may be employed in combination with at least one of the rotary hammer 1 of the above-described embodiment, the above-described modifications, the above-described Aspects A1 to A7, the above-described Aspects B1 to B15, and the claimed features.

For example, the power tool according to the present disclosure may be embodied as a power tool having a hammer mechanism that is configured to perform only the hammer action (e.g., an electric hammer (a demolition hammer or a scraper)). The structures and/or arrangements of the body housing, the handle member, the motor, and the hammer mechanism in the power tool may be appropriately changed from those in the above-described embodiment. For example, the motor 31 may be disposed such that the motor axis MX is orthogonal to the driving axis DX, or the motor axis MX extends in parallel to the driving axis DX. Further, a well-known mechanism including a crank shaft, for example, may be employed as the hammer mechanism.

The structure of coupling the body housing and the handle member is not limited to the example in the above-described embodiment. For example, each of two opposite end portions of the handle member may be coupled to the body housing via an elastic member to be movable only in the front-rear direction relative to the body housing. As an elastic member that is interposed between the body housing and the handle member, a different type of spring, elastomer, a synthetic resin (plastic, polymeric) foam, etc. may be employed in place of the compression coil spring in the above-described embodiment.

The manipulation part and the switch of the present disclosure are not limited to the manipulation part 6 and the switch 7 of the above-described embodiment, respectively. For example, the number and/or arrangements of the switches 7 and the corresponding buttons 65 of the manipulation part 6 may be appropriately changed. The switch may be configured as an electronic switch that electronically opens and closes a circuit using an electron tube or a semiconductor device, instead of a mechanical switch such as the switch 7 of the above-described embodiment. Further, the manipulation part and the switch may be integrated. For example, a membrane switch having a contact integrated with a sheet may be employed.

DESCRIPTION OF THE REFERENCE NUMERALS

1: rotary hammer, 10: body housing, 11: first housing part, 110: opening, 111: barrel part, 113: opening, 12: handle housing part, 121: beam part, 122: coupling protrusion, 123: receiving part, 125: screw, 127: rib, 15: second housing part, 15L: left half, 15R: right half, 151: opening, 152: shaft supporting part, 153: recess, 17: inner housing, 175: contact part, 2: handle member, 2L: left half, 2R: right half, 21: grip part, 211: trigger, 213: main switch, 23: upper extending part, 230: elastic member, 235: contact part, 24: upper coupling part, 240: internal space, 241: opening, 242: rear end, 243: surface, 244: surface, 245: through hole, 247: spring support part, 25: lower extending part, 26: controller housing part, 261: battery mount part, 27: pivotable coupling part, 270: elastic member, 271: coupling shaft, 28: facing part, 280: facing surface, 283: opening, 284: rib, 30: controller, 31: motor, 310: motor body, 315: motor shaft, 4: driving mechanism, 40: spindle, 401: tool holder, 41: hammer mechanism, 42: motion converting mechanism, 43: oscillating member, 44: hammer element, 46: rotation transmitting mechanism, 5: switch unit, 50: circuit board, 51: screw, 6: manipulation part, 60: manipulation panel, 600: outer surface, 61: base part, 611: inner surface, 612: outer surface, 613: protrusion, 615: protrusion, 616: opening, 617: protruding piece, 62: hole, 65: button, 651: first button, 652: second button, 66: arm part, 661: first arm part, 662: second arm part, 67: flexible sheet, 671: mark, 672: mark, 675: window, 7: switch, 70: push button, 71: first switch, 72: second switch, 8: indication part, 81: LED, 83: LED, 91: tool accessory, 93: battery, DX: driving axis, MX: motor axis, PX: pivot axis

What is claimed is:

1. A reciprocating tool comprising:
   a motor;
   a reciprocating mechanism that (i) is operably coupled to the motor and (ii) is configured to linearly reciprocate a tool accessory along a driving axis that defines a front-rear direction of the reciprocating tool;
   a body housing that houses the motor and the reciprocating mechanism;
   a handle member that includes a grip part that (i) is located rearward of the body housing and (ii) extends in an up-down direction that intersects the driving axis; and
   an elastic member,
   wherein:
   a first one of the body housing and the handle member includes a first coupling part,
   a second one of the body housing and the handle member includes a second coupling part,
   the body housing and the handle member are coupled via the first coupling part and the second coupling part to be movable relative to each other in the front-rear direction,
   the first coupling part extends in the front-rear direction and has (i) an internal space and (ii) an opening that communicates with the internal space and an outside space of the first coupling part in a direction that is orthogonal to the front-rear direction, at least a portion of the second coupling part (i) protrudes into the internal space through the opening of the first coupling part in the direction that is orthogonal to the front-rear direction and (ii) is movable relative to the first coupling part in the front-rear direction within the opening, and the elastic member (i) is disposed in the internal space of the first coupling part and (ii) is configured to bias the first coupling part and the second coupling part such that the body housing and the handle member are biased away from each other in the front-rear direction, wherein the handle member includes the first coupling part, and the body housing includes the second coupling part that is configured as a protrusion.

2. The reciprocating tool as defined in claim 1, wherein a portion of the handle member that extends frontward from an upper end portion of the grip part includes the first coupling part.

3. The reciprocating tool as defined in claim 2, wherein:
a direction that is orthogonal to the front-rear direction and the up-down direction defines a left-right direction of the reciprocating tool,
at least a portion of the handle member is formed by two handle halves that are coupled to each other in the left-right direction, and
the internal space of the first coupling part is defined by the two handle halves,
at least a portion of the body housing is formed by two housing halves that are coupled to each other in the left-right direction,
a first one of the two housing halves includes the second coupling part, and
the second coupling part is coupled to a second one of the two housing halves.

4. The reciprocating tool as defined in claim 3, wherein:
a rear end of the second coupling part is directly in contact with a front end of the elastic member in the front-rear direction, and
a front end of the second coupling part is configured to define an initial position of the handle member relative to the body housing by abutting a portion of the first coupling part while being biased forward by the elastic member.

5. The reciprocating tool as defined in claim 4, wherein:
a rear end portion of the body housing has a rear end opening that opens rearward and communicates with an internal space and an outside space of the body housing,
the first coupling part extends into the body housing through the rear end opening, and
a rear end of the opening of the first coupling part is located frontward of the rear end opening of the body housing.

6. The reciprocating tool as defined in claim 5, wherein:
the body housing includes a third coupling part,
the handle member includes a fourth coupling part,
the body housing and an upper end portion of the handle member are coupled via the first coupling part and the second coupling part to be movable relative to each other in the front-rear direction, and
the body housing and a lower end portion of the handle member are coupled via the third coupling part and the fourth coupling part to be movable relative to each other around a pivot axis that extends in a left-right direction that is orthogonal to the front-rear direction and the up-down direction.

7. The reciprocating tool as defined in claim 6, wherein the first coupling part is disposed such that a straight line that is orthogonal to the pivot axis and extends in the up-down direction intersects the first coupling part.

8. The reciprocating tool as defined in claim 2, wherein:
a direction that is orthogonal to the front-rear direction and the up-down direction defines a left-right direction of the reciprocating tool,
at least a portion of the handle member is formed by two handle halves that are coupled to each other in the left-right direction, and
the internal space of the first coupling part is defined by the two handle halves.

9. The reciprocating tool as defined in claim 1, wherein:
a direction that is orthogonal to the front-rear direction and the up-down direction defines a left-right direction of the reciprocating tool,
at least a portion of the body housing is formed by two housing halves that are coupled to each other in the left-right direction,
a first one of the two housing halves includes the second coupling part, and
the second coupling part is coupled to a second one of the two housing halves.

10. The reciprocating tool as defined in claim 1, wherein the elastic member is directly in contact with a rear end of the second coupling part in the front-rear direction.

11. The reciprocating tool as defined in claim 10, wherein a front end of the second coupling part is configured to define an initial position of the handle member relative to the body housing by abutting a portion of the first coupling part.

12. The reciprocating tool as defined in claim 1, wherein:
a rear end portion of the body housing has a rear end opening that opens rearward and communicates with an internal space and an outside space of the body housing,
the first coupling part extends into the body housing through the rear end opening, and
a rear end of the opening of the first coupling part is located frontward of the rear end opening of the body housing.

13. The reciprocating tool as defined in claim 1, wherein:
the body housing includes a third coupling part,
the handle member includes a fourth coupling part,
the body housing and an upper end portion of the handle member are coupled via the first coupling part and the second coupling part to be movable relative to each other in the front-rear direction, and
the body housing and a lower end portion of the handle member are coupled via the third coupling part and the fourth coupling part to be movable relative to each other around a pivot axis that extends in a left-right direction that is orthogonal to the front-rear direction and the up-down direction.

14. The reciprocating tool as defined in claim 13, wherein the first coupling part is disposed such that a straight line that is orthogonal to the pivot axis and extends in the up-down direction intersects the first coupling part.

15. A reciprocating tool comprising:
a motor;
a reciprocating mechanism that (i) is operably coupled to the motor and (ii) is configured to linearly reciprocate a tool accessory along a driving axis that defines a front-rear direction of the reciprocating tool;
a body housing that houses the motor and the reciprocating mechanism;
a handle member that includes a grip part that (i) is located rearward of the body housing and (ii) extends in an up-down direction that intersects the driving axis; and
an elastic member, wherein:
a first one of the body housing and the handle member includes a first coupling part,
a second one of the body housing and the handle member includes a second coupling part,
the body housing and the handle member are coupled via the first coupling part and the second coupling part to be movable relative to each other in the front-rear direction,
the first coupling part has (i) an internal space and (ii) an opening that communicates with the internal space and an outside space of the first coupling part,
at least a portion of the second coupling part (i) protrudes into the internal space through the opening of the first coupling part and (ii) is movable relative to the first coupling part in the front-rear direction within the opening,
the elastic member (i) is disposed in the internal space of the first coupling part and (ii) is configured to bias the first coupling part and the second coupling part such that the body housing and the handle member are biased away from each other in the front-rear direction,
the handle member includes the first coupling part,
the body housing includes the second coupling part that is configured as a protrusion,
a portion of the handle member that extends frontward from an upper end portion of the grip part includes the first coupling part,
a direction that is orthogonal to the front-rear direction and the up-down direction defines a left-right direction of the reciprocating tool,
at least a portion of the handle member is formed by two handle halves that are coupled to each other in the left-right direction,
the internal space of the first coupling part is defined by the two handle halves,
at least a portion of the body housing is formed by two housing halves that are coupled to each other in the left-right direction,
a first one of the two housing halves includes the second coupling part,
the second coupling part is coupled to a second one of the two housing halves,
a rear end of the second coupling part is directly in contact with a front end of the elastic member in the front-rear direction, and
a front end of the second coupling part is configured to define an initial position of the handle member relative to the body housing by abutting a portion of the first coupling part while being biased forward by the elastic member.

* * * * *